United States Patent
Alvarez et al.

(10) Patent No.: US 10,902,726 B2
(45) Date of Patent: Jan. 26, 2021

(54) ROGUE VEHICLE DETECTION AND AVOIDANCE

(71) Applicant: Intel Corporation, Santa Clara, CA (US)

(72) Inventors: Ignacio Alvarez, Portland, OR (US); Victor Palacios Rivera, Guadalajara (MX); Daniel Lake, Hillsboro, OR (US); David Arditti Ilitzky, Zapopan (MX); Rafael de la Guardia Gonzalez, Guadalajara (MX); Patrick Mead, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 229 days.

(21) Appl. No.: 16/111,041

(22) Filed: Aug. 23, 2018

(65) Prior Publication Data
US 2019/0051179 A1     Feb. 14, 2019

(51) Int. Cl.
*G08G 1/16*     (2006.01)
*H04W 4/00*     (2018.01)
(Continued)

(52) U.S. Cl.
CPC ............ *G08G 1/162* (2013.01); *B60W 30/00* (2013.01); *G05D 1/0214* (2013.01); *G08G 1/207* (2013.01);
(Continued)

(58) Field of Classification Search
CPC ............ G08G 1/00; G08G 1/16; G08G 1/162; G08G 1/207; H04W 4/00; H04W 4/46;
(Continued)

(56) References Cited

U.S. PATENT DOCUMENTS 10,081,357 B2 *   9/2018   Saigusa ................. G08G 1/166
10,332,321 B2 *   6/2019   Kumabe ............. G07C 5/0816
(Continued)

OTHER PUBLICATIONS

Waibel, Sartre: Autonomous cars platoons, downloaded from http://spectrum.ieee.org/automaton/robotics/industrialrobots/sartre-autonomous-car-platoons on Dec. 26, 2018, dated Jan. 31, 2011, 3 pages.
(Continued)

*Primary Examiner* — Yonel Beaulieu
(74) *Attorney, Agent, or Firm* — Schiff Hardin LLP

(57) ABSTRACT

Systems and methods for detecting rogue vehicles within a plurality of vehicles connected via a vehicular ad-hoc network (VANET) are provided. Sensors on each VANET vehicle provide host vehicle data and data associated with other nearby vehicles. Each VANET vehicle multicasts information that includes location, velocity, and preferred future travel path to the other VANET vehicles. Using data from sensors and data received from other VANET vehicles the host vehicle generates a dynamic set of safe vehicle operating behaviors. Nearby vehicles that do not comply with the determined safe vehicle operating behaviors or perform illegal/unsafe acts are identified as rogue vehicles. Data associated with identified rogue vehicles is transmitted to all VANET vehicles. Each VANET vehicle determines a preferred future travel path based on the received information associated with rogue vehicles, the preferred future travel path information received from other VANET vehicles, and the host vehicle's safe vehicle operating behaviors.

30 Claims, 18 Drawing Sheets

(51) Int. Cl.
  *H04W 4/46* (2018.01)
  *B60W 30/00* (2006.01)
  *G01D 1/00* (2006.01)
  *H04W 4/02* (2018.01)
  *H04W 84/18* (2009.01)
  *G08G 1/00* (2006.01)
  *G05D 1/02* (2020.01)
  *H04W 4/029* (2018.01)
  *H04L 29/08* (2006.01)

(52) U.S. Cl.
  CPC ............ *H04W 4/02* (2013.01); *H04W 4/029* (2018.02); *H04W 4/46* (2018.02); *H04L 67/12* (2013.01); *H04W 84/18* (2013.01)

(58) Field of Classification Search
  CPC ....... H04W 4/029; H04W 4/02; H04W 84/18; B60W 30/00; B60W 30/095; B60W 30/0956; B60W 30/09; H04L 67/00; H04L 67/12
  See application file for complete search history.

(56) References Cited

U.S. PATENT DOCUMENTS

| 10,339,731 | B2* | 7/2019 | Kumabe | G07C 5/008 |
|---|---|---|---|---|
| 2005/0060069 | A1* | 3/2005 | Breed | B60N 2/2863 |
| | | | | 701/408 |
| 2005/0134440 | A1* | 6/2005 | Breed | G01S 17/89 |
| | | | | 340/435 |
| 2016/0362104 | A1* | 12/2016 | Miller | B60W 30/08 |
| 2017/0369055 | A1* | 12/2017 | Saigusa | G08G 1/0116 |
| 2018/0345961 | A1* | 12/2018 | Saigusa | G08G 1/166 |
| 2019/0351899 | A1* | 11/2019 | Adam | B60W 10/04 |
| 2020/0043342 | A1* | 2/2020 | Cunningham | H04W 4/80 |
| 2020/0128372 | A1* | 4/2020 | Zhang | H04W 4/44 |

OTHER PUBLICATIONS

Ackerman, A Thousand Kilobots Self-Assemble Into Complex Shapes, downloaded from http://spectrum.ieee.org/automaton/robotics/robotics-hardware/a-thousand-kilobots-self-assemble on Nov. 23, 2018, dated Aug. 14, 2014, 2 pages.
Alonso-Mora et al., Multi-robot Navigation in Formation via Sequential Convex Programming, 2015 IEEE/RSJ International Conference on Intelligent Robots and Systems (IROS) Congress Center Hamburg, Sep. 28-Oct. 2, 2015. Hamburg, Germany, 8 pages.
Mizokami, The Pentagon's Autonomous Swarming Drones Are the Most Unsettling Thing You'll See Today, downloaded from http://www.popularmechanics.com/military/aviation/a24675/pentagon-autonomous-swarming-drones/ on Nov. 30, 2018, dated Jan. 19, 2017, 7 pages.
Apu et al., Battle Swarm: An Evolutionary Approach to Complex Swarm Intelligence, Department of Computer Science, University of Calgary, date unknown, 12 pages.
Toor et al. Vehicle Ad Hoc Networks: Application and Related Technical Issues, IEEE Communication Surveys and Tutorials 3rd Quarter 2018, vol. 10, No. 3, 2018, 15 pages.
Buchenscheit et al., A VANET-based Emergency Vehicle Warning System, In the Proceedings of the IEEE Vehicular Networking Convergence, 2009 IEEE, 8 pages.
Campos-Macias, et al., A Hybrid Method for Online Trajectory Planning of Mobile Robots in Cluttered Environments, IEEE Robotics and Automation Letters, vol. 2, No. 2, Apr. 2017, 8 pages.
Spears, et al., An Overview of Physicomimetics, Computer Science Department, University of Wyoming, Swarm Robotics WS2004, LNCS 3342, pp. 84-97, 2005, 14 pages.

* cited by examiner

ROGUE VEHICLE DETECTION AND AVOIDANCE

TECHNICAL FIELD

The present disclosure relates to systems and methods of vehicular collision avoidance.

BACKGROUND

Newly developed autonomous vehicles should coexist with manual or semi-autonomous vehicles using the existing transportation infrastructure. A seemingly simple, but key safety element is that autonomous, semi-autonomous, and manually controlled vehicles should avoid unintended physical contact. For example, an autonomous automobile should avoid contacting (i.e., causing an accident) with another automobile. In an environment where every vehicle can be networked and under autonomous control, avoiding vehicular accidents is resolved by centralized or distributed control schema that prevent two vehicles from occupying the same space at a future time. By repeating this, "no two objects in the same place at the same time" mantra, the likelihood of vehicular collisions is reduced or eliminated.

However, for the foreseeable future, transportation infrastructure must support a hybrid traffic flow that includes a mixture of autonomous (e.g., Level 5) vehicles, semi-autonomous (e.g., Levels 1-4) vehicles, and manually controlled (i.e., Level 0) vehicles. While autonomous vehicles may be capable of predicting the movement of other autonomous vehicles within a three-dimensional space, there is an inherent variability of movement in semi-autonomous and manually controlled vehicles. In addition, even autonomous vehicles may experience failures that compromise the predictability of movement of the autonomous vehicle.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
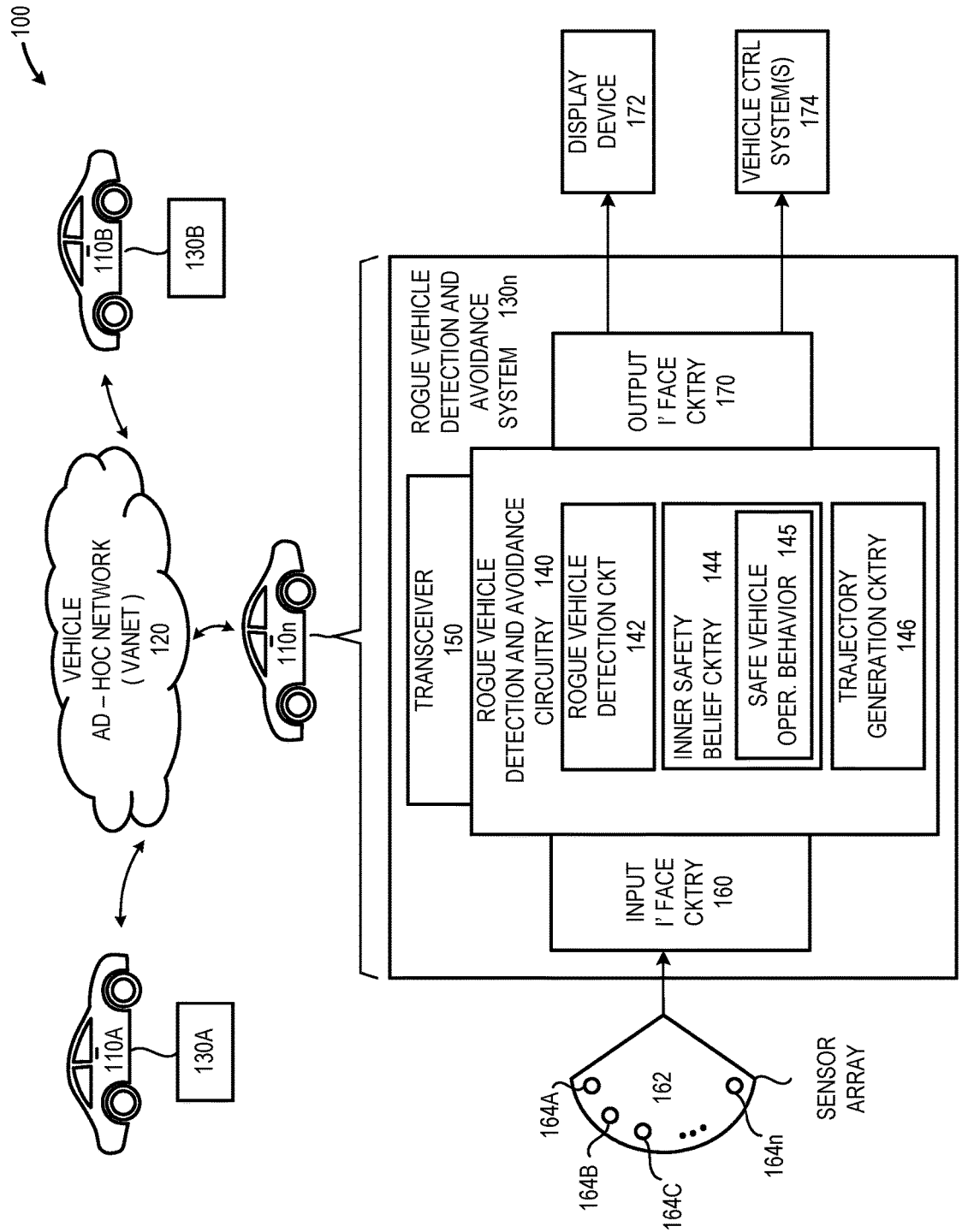
FIG. 1 provides a high level block diagram of an illustrative system that includes a plurality of vehicles communicably coupled via a vehicle ad-hoc network (VANET), in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

Current autonomous vehicle development considers deployment of such autonomous vehicles in environments containing a mixture of autonomous vehicles, semi-autonomous vehicles, and vehicles under manual control. Given the often unpredictable or variable nature of vehicular movement in such environments, autonomous and semi-autonomous vehicles are typically developed to safely operate under the most constrained or adversarial environments where the vehicle will operate using on-board sensors and signal processing. The general trend in industry is that most vehicles will be equipped with telematics having the potential to wirelessly communicate parametric data (vehicle performance, location, velocity, altitude, acceleration, etc.) with other vehicles over a communication infrastructure.

The systems and methods described herein provide coordination of distributed strategies for collision avoidance in a real-world environment that includes a mixture of autonomous, semi-autonomous, and manually operated vehicles. More particularly, the systems and methods described herein permit any number of vehicles to communicate via a vehicle ad-hoc network (i.e., a "VANET"). Each vehicle included in the VANET is then able to exchange performance, location, acceleration/deceleration, velocity, distance between vehicles, and similar information and/or data with other vehicles included in the VANET. Within each vehicle included in the VANET, inner safety belief circuitry generates a set of safe vehicle operation behaviors based on both the operating parameters of the vehicle carrying the inner safety belief circuitry and the operating parameters provided by other vehicles included in the VANET. Beneficially and advantageously, the safe vehicle operation behaviors generated by the inner safety belief circuitry in each vehicle provide a dynamic set of safe operating behaviors that reflect, in near real-time, local road conditions, local environmental conditions, construction, and roadside emergencies.

In addition, the vehicles included in the VANET also include trajectory generation circuitry to determine a preferred future path for the vehicle. The preferred future path may be generated based on either or both the local information collected by the vehicle and/or the information provided by the other vehicles included in the VANET. The exchange of location and preferred future path information between vehicles included in the VANET permits the inner safety belief circuitry in each of the vehicles to proactively detect future path interferences (i.e., potential collisions). The inner safety belief circuitry determines a level of current and/or future risk presented to the host vehicle by each nearby vehicle. Based on the determined level of risk presented by each vehicle, the inner safety belief circuitry is able to selectively cause the trajectory generation circuitry in the host vehicle to determine a preferred future travel path that minimizes the risk to the host vehicle presented by one or more other vehicles. Beneficially, the exchange of location and future path information between the vehicles included in the VANET permits an efficient, coordinated, movement of each of the vehicles included in the VANET.

Advantageously, the collective determination of safe vehicle operating behaviors by the vehicles included in the VANET permits each of the VANET connected vehicles to detect whether a vehicle is operating contrary to one or more established safe vehicle operating behaviors. Rogue vehicle detection circuitry in each VANET connected vehicle compares information collected from surrounding vehicles and analyzes the collected information to determine whether the a vehicle is operating contrary to one or more established safe vehicle operating behaviors. The rogue vehicle detection circuitry may designate a vehicle operating in an unsafe or illegal manner as "rogue vehicle." Illustrative behaviors contrary to one or more established safe vehicle operating behaviors may include: a vehicle operating in violation of traffic laws (failure to stay in lane, failure to stop, failure to yield, speeding, etc.); improper or no signaling; failing to follow a preferred future path communicated to VANET vehicles; abrupt lane changes, stopping, and/or acceleration; and similar. Vehicles may be identified as a rogue vehicle for a variety of reasons. For example, malfunction of control systems and/or sensors in an automated vehicle, human error or misbehavior in manually operated vehicles. Rogue vehicles may also occur as a result of attacks (i.e., hacks) that compromise the security of the vehicle and alter the vehicle control strategy to a point that the vehicle represents a danger to other vehicles within the VANET. Information such as the location, velocity, and/or path of the rogue vehicle is communicated to each VANET vehicle to permit the trajectory generation circuitry in each vehicle to generate a preferred future path that minimizes the potential for interaction with the rogue vehicle.

Upon identification of a rogue vehicle, the systems and methods described herein beneficially and advantageously permit the trajectory generation circuitry in each VANET vehicle to determine a preferred future path that avoids, evades, or otherwise minimizes the likelihood of interaction with the identified rogue vehicle. Each of the VANET vehicles communicates their preferred future path to other VANET vehicles. Using the rogue vehicle information and the received preferred path information from other vehicles, the trajectory generation circuitry in each VANET vehicle determines a preferred path that avoids both the rogue vehicle and every other safely operated VANET vehicle. The disclosed systems and methods advantageously provide extremely robust rogue vehicle detection and avoidance capabilities that are particularly well suited to operation in hybrid environments that contain a mixture of autonomous, semi-autonomous, and manually operated vehicles.

The use of information received from other VANET vehicles effectively increases the line-of-sight of each VANET vehicle beyond any immediately surrounding vehicles, thereby enhancing safety by reducing unknown information in the field, increasing vehicle energy efficiency by simplifying calculations on surrounding vehicles, and improving traffic flow via asynchronous coordination resulting from the share of intents. The determination of safe vehicle operating behaviors by each VANET vehicle beneficially permits the rogue vehicle detection circuitry in each VANET vehicle to identify rogue vehicles that violate one or more of the safe vehicle operating parameters. Based on preferred future path information received from other VANET vehicles and internally generated or externally received rogue vehicle information, the trajectory generation circuitry in each VANET vehicle beneficially determines an appropriate preferred path that avoids the rogue vehicle while asynchronously collaborating with other VANET vehicles such that the determined preferred paths for each VANET vehicle do not cause and/or result in an intersecting path (i.e., a collision) with either the rogue vehicle or any other VANET vehicle.

A rogue vehicle detection method is provided. The method may include: receiving, at rogue vehicle detection circuitry in a host vehicle, one or more signals that include information indicative of one or more behaviors of the host vehicle; receiving, at transceiver circuitry in the host vehicle, a plurality of messages, each of the plurality of messages associated with a respective one of a plurality of vehicular ad-hoc network connected vehicles (VANET vehicles), wherein each of the plurality of messages includes: information indicative of a current location and a future preferred path of the respective VANET vehicle; identifying, by inner safety belief circuitry, one or more safe vehicle operating behaviors; identifying, by the rogue vehicle detection circuitry, a rogue vehicle based on the one or more identified safe vehicle operating behaviors; determining, by the trajectory generation circuitry, a preferred future travel path for the host vehicle based on: the preferred future travel path of respective ones of the VANET vehicles; the identified rogue vehicle; and the one or more safe vehicle operating behaviors; and transmitting, via the transceiver circuitry, data representative of the determined preferred future travel path of the host vehicle to each of the VANET vehicles.

A rogue vehicle detection system is provided. The system may include: input interface circuitry; transceiver circuitry; output interface circuitry; rogue vehicle detection circuitry coupled to the input interface circuitry, the transceiver circuitry, and the output interface circuitry; and a storage device that includes machine-readable instructions that, when executed by the rogue vehicle detection circuitry, cause the rogue vehicle detection circuitry to: receive, via the transceiver circuitry, one or more signals that include information indicative of one or more behaviors of a host vehicle; receive, via the transceiver circuitry, a plurality of messages, each associated with a respective one of a plurality of vehicular ad-hoc network connected vehicles (VANET vehicles), wherein each of the plurality of messages includes: information indicative of a current location and a future preferred path of the respective VANET vehicle; identify one or more safe vehicle operating behaviors; identify a rogue vehicle using the one or more identified safe vehicle operating behaviors; determine a preferred future travel path for the host vehicle based, at least in part, on: the future preferred path of respective ones of the VANET vehicles; the identified rogue vehicle; and the one or more safe vehicle operating behaviors; and cause a transmission, via the transceiver circuitry, of data representative of the determined future preferred path of the host vehicle to each of the VANET vehicles.

A non-transitory storage device that includes machine-readable instructions is provided. The machine-readable instructions, when executed by rogue vehicle detection circuitry, cause the rogue vehicle detection circuitry to: receive one or more signals that include information indicative of one or more behaviors of a host vehicle; receive a plurality of messages, each associated with a respective one of a plurality of vehicular ad-hoc network connected vehicles (VANET vehicles), wherein each of the plurality of messages includes: information indicative of a current location and a future preferred path of the respective VANET vehicle; identify one or more safe vehicle operating behaviors; identify a rogue vehicle using the one or more identified safe vehicle operating behaviors; determine a preferred future travel path for the host vehicle based, at least in part, on: the future preferred path of respective ones of the VANET vehicles; the identified rogue vehicle; and the one or more safe vehicle operating behaviors; and cause a transmission of data representative of the determined future preferred path of the host vehicle to each of the VANET vehicles.

A host vehicle that includes a rogue vehicle detection system is provided. The host vehicle may include: one or more sensors; at least one output device; rogue vehicle detection and avoidance system, comprising: input interface circuitry coupled to the one or more sensors; transceiver circuitry; output interface circuitry; rogue vehicle detection and avoidance circuitry coupled to the input interface circuitry, the transceiver circuitry, and the output interface circuitry; and a storage device that includes machine-readable instructions that, when executed by the rogue vehicle detection circuitry, cause the rogue vehicle detection circuitry to: receive, via the transceiver circuitry, one or more signals that include information indicative of one or more behaviors of a host vehicle; receive, via the transceiver circuitry, a plurality of messages, each associated with a respective one of a plurality of vehicular ad-hoc network connected vehicles (VANET vehicles), wherein each of the plurality of messages includes: information indicative of a current location and a future preferred path of the respective VANET vehicle; identify one or more safe vehicle operating behaviors; identify a rogue vehicle using the one or more identified safe vehicle operating behaviors; determine a preferred future travel path for the host vehicle based, at least in part, on: the future preferred path of respective ones of the VANET vehicles; the identified rogue vehicle; and the one or more safe vehicle operating behaviors; and cause a transmission, via the transceiver circuitry, of data representative of the determined future preferred path of the host vehicle to each of the VANET vehicles.

A rogue vehicle detection system is provided. The system may include: means for receiving one or more signals that include information indicative of one or more behaviors of the host vehicle; means for receiving a plurality of messages, each of the plurality of messages associated with a respective one of a plurality of vehicular ad-hoc network connected vehicles (VANET vehicles), wherein each of the plurality of messages includes: information indicative of a current location and a future preferred path of the respective VANET vehicle; means for identifying one or more safe vehicle operating behaviors; means for identifying a rogue vehicle based on the one or more identified safe vehicle operating behaviors; means for determining a preferred future travel path for the host vehicle based on: the preferred future travel path of respective ones of the VANET vehicles; the identified rogue vehicle; and the one or more safe vehicle operating behaviors; and means for transmitting data representative of the determined preferred future travel path of the host vehicle to each of the VANET vehicles.

Rogue vehicle detection circuitry is provided. The rogue vehicle detection circuitry may generate a communications packet for transmission from a host vehicle to each of at least some of a plurality of vehicular ad-hoc network connected vehicles (VANET vehicles). The communications packet may include: a first field that includes data indicative of a current location of the host vehicle; a second field that includes data representative of a preferred future travel path of the host vehicle; a third field that include data representative of a rogue vehicle, the rogue vehicle non-compliant with at least one of one or more safe vehicle behavior parameters; and a fourth field that includes data indicative of a current location of the rogue vehicle.

FIG. 1 provides a high level block diagram of an illustrative system 100 that includes a plurality of vehicles 110A-110n (collectively, "vehicles 110") communicably coupled via a vehicle ad-hoc network (VANET) 120, in accordance with at least one embodiment described herein. For ease of discussion and conciseness, each vehicle 110 coupled to the VANET will be referred to as a "VANET vehicle 110." As depicted in FIG. 1, each of the VANET vehicles 110A-110n includes a respective rogue vehicle detection system 130A-130n (collectively, "rogue vehicle detection system 130"). Each rogue vehicle detection system 130 includes rogue vehicle detection and avoidance circuitry 140 coupled to a transceiver 150, input interface circuitry 160, and output interface circuitry 170. The rogue vehicle detection and avoidance circuitry 140 includes rogue vehicle detection circuitry 142, inner safety belief circuitry 144, and trajectory generation circuitry 146. In embodiments, the input interface circuitry 160 may couple one or more sensors or sensor arrays 162 to the rogue vehicle detection and avoidance circuitry 140. In embodiments, the output interface circuitry 170 may couple a display device 172 and/or one or more vehicle control systems 174 to the rogue vehicle detection and avoidance circuitry 140.

Using the sensor array 162, each VANET vehicle 110A-110n collects vehicle performance data associated with the host VANET vehicle as well as information and/or data associated with one or more vehicles external to the vehicle carrying the respective rogue vehicle detection system 130A-130n. The collected information is communicated to other VANET vehicles 110 via the vehicle ad-hoc network 120. The sharing of vehicle performance and environmental data permits the inner safety belief circuitry 144A-144n each of the VANET vehicles 110A-110n to determine or otherwise ascertain a set of safe vehicle operating behaviors that form the basis for detecting the presence of one or more rogue vehicles among the VANET vehicles 110. In addition, the inner safety belief circuitry 144 and the trajectory determination circuitry 146 in each VANET vehicle 110 cooperatively determine a preferred future path for the host VANET vehicle 110.

The rogue vehicle detection and avoidance circuitry 140 in each VANET vehicle 110 communicates information and/or data representative of the determined future path for the respective vehicle to the other VANET vehicles 110. In determining a preferred future path, the inner safety belief circuitry 144 and the trajectory determination circuitry 146 in each VANET vehicle 110 considers the preferred future path of each of the other VANET vehicles 110 to detect potential collisions or other impermissible actions. In the event the inner safety belief circuitry 144 detects a potential collision, a transgression of a rogue vehicle that impacts the host vehicle and/or another vehicle, or another illegal, unsafe, or impermissible action, the inner safety belief circuitry 144 causes the trajectory determination circuitry 146 to determine a new preferred future path that minimizes the likelihood or even eliminates the potential collision, reduces the risk associated with that detected rogue vehicle or other impermissible action. Thus, the VANET vehicles 110 collaborate via an exchange of vehicle performance information to determine a preferred future path for each VANET vehicle that avoids a collision or other impermissible action.

The sensor array 162 on each of the VANET vehicles 110 gathers information associated with other nearby vehicles. For example, the sensor array may collect information such as the velocity, acceleration, and location of one or more nearby vehicles. In embodiments, the rogue vehicle detection circuitry 142 and the inner safety belief circuitry 144 may compare the information associated with a nearby vehicle with the host vehicle safe vehicle operating behaviors to determine whether the nearby vehicle is operated in an unsafe, illegal, or impermissible manner. If the rogue vehicle detection circuitry 142 determines the nearby vehicle is operating in a manner that contravenes the safe vehicle operating behaviors established by the inner safety belief circuitry 144, the nearby vehicle is identified as a "rogue vehicle." Information, such as the velocity, acceleration, location, position in a lane, braking, etc., associated with the rogue vehicle may be collected and communicated to the other VANET vehicles 110. The presence of and information and/or data associated with a nearby rogue vehicle is used by the inner safety belief circuitry 144 and the trajectory determination circuitry 146 in determining the preferred future path for each of the VANET vehicles 110.

Advantageously, the rogue vehicle may be, but does not have to be, a VANET vehicle 110. For example, other autonomous, semi-autonomous, or manually controlled vehicles may be identified as a rogue vehicle by any one of the VANET vehicles 110 and the vehicle parametric and behavior information communicated to all of the VANET vehicles 110. Thus, the inner safety belief circuitry 144 and the trajectory determination circuitry 146 in some or all of the VANET vehicles 110 determine a preferred future path that avoids or otherwise maximizes the safety distance between the VANET vehicle 110 and the identified rogue vehicle.

Summarizing, the rogue vehicle detection and avoidance circuitry 140 beneficially provides each vehicle 110 connected to an ad-hoc vehicle network 120 the ability to collect vehicle parametric and behavioral data that is communicated to other VANET vehicles 110. The data collected by each VANET vehicle and the received data from other VANET vehicles is used by the inner safety belief circuitry 144 in each VANET vehicle to determine a set of safe vehicle operating behaviors used by the respective vehicle. The inner safety belief circuitry 144 and/or the rogue vehicle detection circuitry 142 in each VANET vehicle 110 uses the safe vehicle operating behaviors, along with other factors such as environmental conditions, estimated braking distances, vehicle occupant behavior, driving style, and compliance with local rules, laws, and customs to identify nearby rogue vehicles operated in an improper, illegal, or unsafe manner. The rogue vehicle detection and avoidance circuitry 140 communicates information associated with the identified rogue vehicle (location, velocity, acceleration, altitude, occupant behavior, infractions, etc.) to other VANET vehicles 110. Each of the VANET vehicles 110 may determine a preferred future travel path based upon the preferred future travel paths of the other VANET vehicles 110 and the information associated with the identified rogue vehicle.

Thus, the rogue vehicle detection and avoidance circuitry 140 beneficially and advantageously: determines a set of safe vehicle operating behaviors; detects rogue vehicles not operated in accordance with the established safe vehicle operating behaviors; communicates information associated with the identified rogue vehicle to other VANET vehicles; and collaboratively coordinates the preferred future travel paths of the VANE vehicles 110 such that collisions are avoided and a safe distance exists between VANET vehicles 110 and the identified rogue vehicle. Further, since vehicle parametric and behavioral information and/or data is collected on a periodic basis from the VANET vehicles 110, the set of safe vehicle operating behaviors determined by the inner safety belief circuitry 144 reflects, in real-time or near real-time, the vehicular and environmental conditions proximate the VANET vehicles 110. The inner safety belief circuitry 144 provides a dynamic set of safe vehicle operating behaviors that reflect real-world conditions, further enhancing vehicular safety in a hybrid driving environment that includes autonomous, semi-autonomous, and manually controlled vehicles.

The vehicles 110A-110n may include any number and/or combination of vehicles capable of two-dimensional or three-dimensional motion. Non-limiting example vehicles 110 include, motor vehicles (cars, trucks, commercial vehicles, municipal vehicles, etc.); fixed wing aircraft; rotary-wing aircraft, and similar. In embodiments, the vehicles 110A-110n may include any number and/or combination of level 1 to level 5 automated motor vehicles. For clarity and ease of discussion, the remaining portion of this disclosure will address rogue vehicle detection and avoidance in terms of motor vehicles. However, one of ordinary skill in the relevant arts would readily appreciate the concepts and principles of rogue vehicle detection and avoidance may apply in part or in whole to any vehicular system that includes one or more of: autonomous, semi-autonomous, and/or manually operated vehicles.

The vehicular ad-hoc network (VANET) 120 is an autonomous, self-configured network that bidirectionally communicably couples vehicles 110A-110n. The VANET 120 may include any network structure and/or protocol that facilitates the formation an ad-hoc network in which vehicles that enter into range of the network (e.g., vehicles having a network signal strength above a defined network connect signal strength) are able to freely join the network and vehicles that leave the range of the network (e.g., vehicles having a network signal strength below a defined network disconnect signal strength) are able to freely leave the network. In embodiments, each of the VANET vehicles 110 may transmit and receive frames or packets that contain information and/or data representative of one or more vehicle operating parameters, one or more vehicle operating behaviors, one or more nearby vehicle operating behaviors, one or more nearby vehicle operating parameters, or combinations thereof. In embodiments, the VANET 120 may include a synchronous communications network that includes one or more timing signals communicated between VANET vehicles 110. In embodiments, the VANET 120 may include an asynchronous communications network. In embodiments, the rogue vehicle detection and avoidance circuitry 140 in each VANET vehicle 110 may periodically multicast data frames or packets across the VANET 120 to some or all of the remaining VANET vehicles 110. In embodiments, the rogue vehicle detection and avoidance circuitry 140 in each VANET vehicle 110 may periodically broadcast data frames or packets across the VANET 120 to some or all of the remaining VANET vehicles 110.

In embodiments, the VANET 120 may include an IEEE 802.11p (latest version—wireless access in vehicular environments or "WAVE") compliant network operating at the 5.9 GHz band licensed for intelligent transportation system (ITS) applications. In embodiments, the VANET 120 may include an IEEE 1609 (latest version) compliant network. The VANET 120 may use any currently available or future developed topology-based network routing protocol, such as: a proactive routing protocol or a reactive/ad-hoc routing protocol. The VANET 120 may use any currently available or future developed position based routing protocol, such as: greedy perimeter coordinator routing (GPCR), connectivity aware routing (CAR), diagonal-intersection-based routing (DIR), delay tolerant, motion vector routing algorithm (MOVE), vehicle assisted data delivery (VADD), or static node assisted adaptive routing (SADV).

The rogue vehicle detection system 130 may include any number and/or combination of currently available and/or future developed devices, systems, and/or components capable of bidirectionally communicating vehicular behaviors among a plurality of VANET vehicles 110, determining safe vehicle operating behaviors, identifying nearby rogue vehicles not compliant with the determined safe vehicle operating behaviors, communicating rogue vehicle information among the plurality of VANET vehicles 110, and coordinating preferred future travel paths with each of the other VANET vehicles 110 such that a probability of interaction occurring between the VANET vehicles 110 and the rogue vehicle is minimized. The rogue vehicle detection system 130 may include any number and/or combination of electric components, semiconductor devices, and/or logic elements. The rogue vehicle detection system 130 may include the rogue vehicle detection and avoidance circuitry 140, one or more transceivers 150, input interface circuitry 160, and output interface circuitry 170. In embodiments, the rogue vehicle detection system 130 may be a stand-alone system that can be added as an aftermarket accessory to vehicles. The rogue vehicle detection system 130 may be incorporated into one or more factory installed and/or configured on-board systems, such as an in-vehicle infotainment (IVI) system. In embodiments, the rogue vehicle detection system 130 may include one or more application specific integrated circuits (ASICs); one or more systems-on-chip (SoC); or similar.

The rogue vehicle detection and avoidance circuitry 140 includes any number and/or combination of electrical components, semiconductor devices, and/or logic elements capable of providing the rogue vehicle detection circuitry 142, the inner safety belief circuitry 144, and the trajectory generation circuitry 146.

The inner safety belief circuitry 144 receives vehicular performance, parametric, and behavioral information and/or data generated or collected by the host VANET vehicle 110. In addition, the inner safety belief circuitry 144 may also receive performance, parametric, and behavioral information and/or data generated or collected by each of a plurality of VANET vehicles 110. Using the information and/or data collected from the host vehicle and received from the plurality of VANET vehicles 110, the inner safety belief circuitry 144 determines one or more vehicle operating behaviors 145. Beneficially, the safe vehicle operating behaviors 145 are not static, rather the safe vehicle operating behaviors 145 are determined in real-time or near real-time based on data collected by the VANET vehicles 110. The safe vehicle operating behaviors 145 thus represent current conditions across some or all of the VANET vehicles 110.

For example, on a divided highway with a speed limit of 65 MPH, the VANET vehicles 110 may each have speeds of between 70 MPH and 75 MPH. Ordinarily, the inner safety belief circuitry 144 would form a safe vehicle operating behavior 145 that precludes speeds of greater than the legal limit of 65 MPH. However, in this instance slowing to 65 MPH may actually create, rather than prevent, a hazard. Thus, under these circumstances, the inner safety belief circuitry 144 would instead generate a safe vehicle operating behavior 145 of speed less than 75 MPH, reflective of actual VANET vehicle speeds.

The rogue vehicle detection circuitry 142 receives performance, parametric, and behavioral information and/or data from nearby vehicles external to the host VANET vehicle 110. The rogue vehicle detection circuitry 142 compares the performance, parametric, and behavioral information and/or data received from the nearby vehicles with the safe vehicle operating behaviors 145 to determine whether the nearby vehicle is operating in an unsafe or illegal manner (i.e., whether the nearby vehicle should be considered a "rogue" vehicle). Beneficially, the rogue vehicle detection circuitry 142 uses information collected by the host VANET vehicle 110 in making the rogue vehicle determination and is thus able to detect nearby rogue vehicles regardless of whether the nearby vehicle is autonomously controlled, semi-autonomously controlled, or even manually controlled.

The trajectory generation circuitry 146 receives information and/or data from other VANET vehicles 110 via the transceiver 150. The trajectory generation circuitry 146 uses the performance, parametric, and behavioral information collected from the host vehicle and the information and/or data representative of the preferred future travel paths received from other VANET vehicles 110 to determine a preferred future travel path that minimizes or eliminates the risk of a future collision with another vehicle. The trajectory generation circuitry 146 also uses the performance, parametric, and behavioral information associated with nearby vehicles, including any nearby vehicles identified by the rogue vehicle detection circuitry 142 as a rogue vehicle, to determine a preferred future travel path. In determining the preferred future travel path for the host vehicle, the trajectory generation circuitry 146 may additionally use performance, parametric, and behavioral information associated with one or more rogue vehicles received from one or more other VANET vehicles 110. In embodiments, the trajectory generation circuitry 146 periodically, aperiodically, or continuously updates the preferred future travel path for the host vehicle based upon information and/or data collected by the sensor array 162 carried by the host vehicle and/or based upon information and/or data received from other VANET vehicles 110.

The input interface circuitry 160 includes any number and/or combination of electrical components, semiconductor devices, and/or logic elements capable of providing signals received from one or more sensors 164A-164n (collectively, "sensors 164") included in a sensor array 162 carried by the host vehicle to the rogue vehicle detection circuitry 140. In embodiments, the input interface circuitry 160 may receive any number and/or combination of analog and/or digital signals from the sensor array 162. In embodiments, the input interface circuitry 160 may perform one or more filtering, noise reduction, or similar signal processing or enhancement to all or a portion of the signals received from the sensor array 162. In embodiments, the input interface circuitry 160 may communicate control information and/or data provided by the rogue vehicle detection and avoidance circuitry 140 to some or all of the one or more sensors 164A-164n included in the sensor array 162.

The sensor array 162 includes any number and/or combination of sensors 164. A first portion of the sensors 164 includes sensors internal to the host vehicle that are intended to measure one or more performance metrics and/or behavior metrics of the host vehicle. Non-limiting examples of such internal sensors include: velocity measurement sensors, braking sensors, steering sensors, accelerometers, microphones, tachometers, geolocation (GPS, GLONASS, Galileo, cellular triangulation, etc.) sensors, occupant monitoring sensors (pressure sensors, facial recognition, physiometric sensors, eye position sensors, etc.), and similar. A second portion of the sensors 164 includes sensors that are intended to measure one or more performance metrics and/or behavior metrics of nearby vehicles external to the host vehicle. Non-limiting examples of such external sensors include: image acquisition and analysis devices (optical cameras, infrared cameras, etc.), LIDAR sensors, radar sensors, ultrasonic sensors, and similar. The sensor array 162 provides information and/or data associated with one or more performance metrics and/or behavior metrics of the host vehicle and performance metrics and/or behavior metrics associated with one or more nearby vehicles to the rogue vehicle detection and avoidance circuitry 140. The rogue vehicle detection and avoidance circuitry 140 uses the provided information and/or data to: determine safe vehicle operating behaviors; identify nearby rogue vehicles; determine a preferred future travel path; and communicate data representative of identified rogue vehicles and the determined preferred future travel path to at least some of the VANET vehicles 110.

The output interface circuitry 170 includes any number and/or combination of electrical components, semiconductor devices, and/or logic elements capable of providing output signals from the rogue vehicle detection and avoidance circuitry 140 to one or more output devices 172 and/or one or more vehicle control systems 174. Non-limiting examples of output devices 172 include: a video output device; an audio output device; a tactile output device; or combinations thereof. In embodiments, the output interface circuitry 170 may be coupled to a vehicle bus structure (e.g., a CAN Bus) and the output provided via one or more output devices 172 coupled to a head unit disposed in the host vehicle. In embodiments, the output interface circuitry 170 may be coupled to one or more vehicle control systems 174. In an autonomous vehicle, the output interface circuitry 170 may be coupled to systems that control the operation of the vehicle. Non-limiting examples of vehicle control systems 174 include: vehicle steering, vehicle braking, vehicle acceleration, vehicle signaling or lighting, vehicle power unit (energy storage unit (battery, supercapacitor, ultracapacitor, etc.), electrical motor, internal combustion engine, etc.).

In embodiments, the rogue vehicle detection and avoidance circuitry 140 may identify rogue vehicles using an algorithm where a function, F, defines the reasoning for the inner safety belief circuitry 144 in a VANET vehicle 110 that a nearby vehicle "A" is rogue based on proof data $pd_i$ that generates an opinion $w_A$—a determinative function of whether nearby vehicle "A" is rogue, as follows:

$$F(A, pd_i) \rightarrow w_A \quad (1)$$

Where $pd_i$ represents an aggregate of multiple proof data points coming from the sensor array 162 as well as data received from other VANET vehicles 110. The opinion $w_A$ may be defined as a function:

$$w_A = (b_A, d_A, u_A, a_A) \quad (2)$$

Where $b_A$ is a value corresponding to the belief that nearby vehicle A is a rogue vehicle, $d_A$ is a value corresponding to the belief that nearby vehicle A is a good citizen, $u_A$ is a value corresponding to uncertainty, and $a_A$ is the atomicity, a priori likelihood of nearby vehicle A being classifiable a rogue vehicle. Based on the above:

$$b_A, d_A, u_A, a_A \in [0,1]; \text{ and} \quad (3)$$

$$b_A + d_A + u_A = 1 \quad (4)$$

In this embodiment, the world view of the inner safety belief circuitry 144 may be represented as:

$$W_v = \{(A_1, w_1) \ldots (A_n, w_n)\} \quad (5)$$

Where $A_1$ to $A_n$ are the nearby vehicles identified using at least their location and velocity vectors and where $w_1$ to $w_n$ are the judgements made by the inner safety belief circuitry 144 and assigned to each of the nearby vehicles. While the judgements made by the inner safety belief circuitry 144 are probabilistic in nature, the judgements are based on information and/or data obtained by the sensor arrays 162 carried by each VANET vehicle and based on normal behavior as measured across some or all of the VANET vehicles 110. The judgement may be shared across the VANET 120 using a physicomimetrics message, that in some embodiments, may have the following format:

$$\text{message} = \{((L_i, v_i), P_i), \{R_v\}\} \quad (6)$$

Where $R_v$ is a subset of the world view containing the nearby vehicles that have been contemporaneously identified as rogue vehicles ($R_v \subseteq W_v$).

Figure 2A:
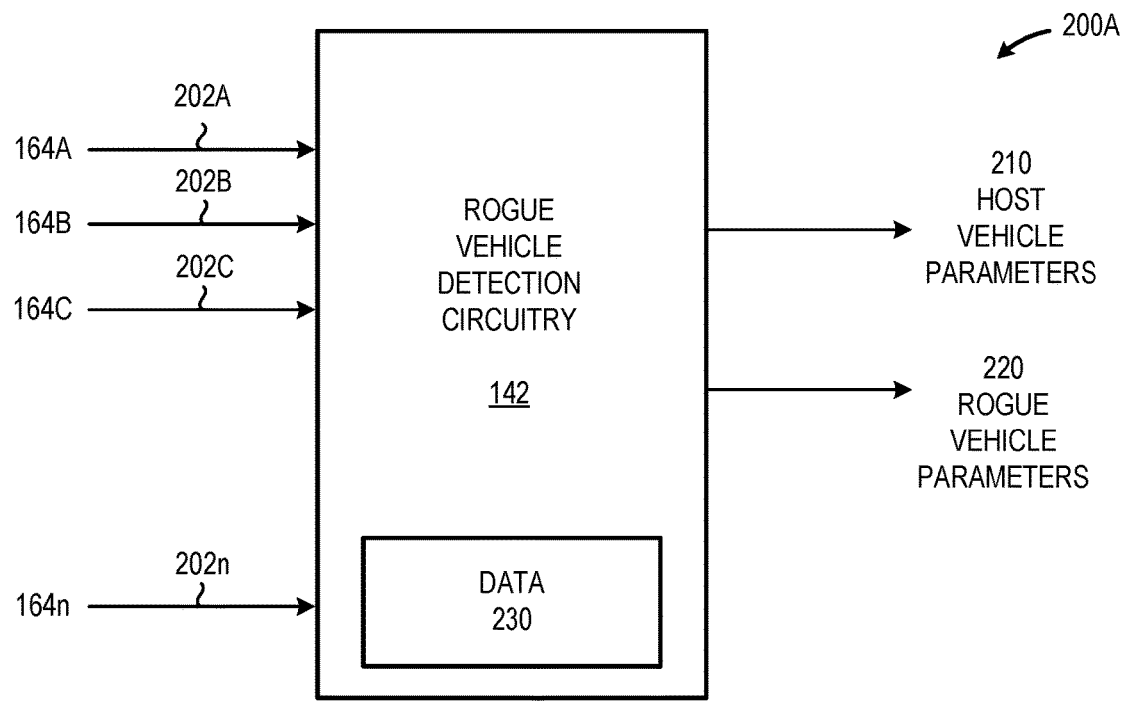
FIG. 2A is an input/output diagram depicting illustrative rogue vehicle detection circuitry inputs and outputs, in accordance with at least one embodiment described herein.

FIG. 2A is an input/output diagram 200A depicting illustrative rogue vehicle detection circuitry 142 inputs and outputs, in accordance with at least one embodiment described herein. As depicted in FIG. 2A, the rogue vehicle detection circuitry 142 receives a plurality of signals 202A-202n from the sensors 164A-164n included in the sensor array 162. The signals 202A-202n may include any number and/or combination of analog and/or digital signals generated by the sensor array 162 and including: information and/or data associated with one or more host vehicle performance parameters and/or behaviors; and information and/or data associated with one or more nearby vehicle performance parameters and/or behaviors. The rogue vehicle detection circuitry 142 may include filtering circuitry, analog-to-digital (A/D) conversion circuitry, digital-to-analog (D/A) conversion circuitry, noise suppression circuitry, signal conditioning circuitry, or combinations thereof. In addition, the rogue vehicle detection circuitry 142 may receive one or more signals 204 that include information and/or data representative of a location or geolocation (GPS, GLONASS, Galileo, etc.) of the host vehicle.

The rogue vehicle detection circuitry 142 may generate one or more host vehicle output signals 210 that include information and/or data associated with the host vehicle. Such host vehicle information and/or data may include: host vehicle location; host vehicle velocity; nearby geographic features; one or more host vehicle operating behaviors; or combinations thereof. The rogue vehicle detection circuitry 142 may also generate one or more rogue vehicle output signals 220 that include information and/or data associated with one or more nearby vehicles. Such nearby vehicle information and/or data may include: nearby vehicle location; nearby vehicle velocity; one or more nearby vehicle operating behaviors; one or more or violations of safe vehicle operating behaviors 145; or combinations thereof.

In embodiments, the rogue vehicle detection circuitry 142 may include circuitry to determine a relative or absolute geolocation of the host vehicle and any nearby vehicles identified as rogue vehicles. Such geolocation may use data 230 that is stored in the rogue vehicle detection circuitry 142 and/or data 230 stored in one or more non-transitory storage devices coupled to the rogue vehicle detection and avoidance circuitry 142. Such data 230 may include high definition maps generated using ground-based lidar or maps generated using aerial imagery. Such data 230 may enable the rogue vehicle detection circuitry 142 to locate the host vehicle within a two-dimensional or three-dimensional environment. Such data 230 may enable the rogue vehicle detection circuitry 142 to locate nearby vehicles identified as rogue vehicles within a two-dimensional or three-dimensional environment. The rogue vehicle detection circuitry 142 may also include data storage circuitry 230 that stores or otherwise retains data representative of safe vehicle operating behaviors 145 determined by the host vehicle and used to by the rogue vehicle detection circuitry 142 to identify nearby rogue vehicles.

The rogue vehicle detection circuitry 142 includes circuitry capable of receiving a plurality of signals 202A-202n and determine a location of the host vehicle. In embodiments, the rogue vehicle detection circuitry 142 includes circuitry capable of determining a location of one or more nearby vehicles. In embodiments, the rogue vehicle detection circuitry 142 includes circuitry capable of identifying whether nearby vehicles are operating in a manner that comports with safe vehicle operating behaviors 145 determined by the host vehicle. In embodiments, the rogue vehicle detection circuitry 142 includes circuitry capable of communicating host vehicle information and/or data and rogue vehicle information and/or data to the inner safety belief circuitry 144.

Example rules that may be implemented by the rogue vehicle detection circuitry 142 may include one or more of the following:

Object classified as a vehicle is not broadcasting location data, velocity data, and/or preferred future travel path data;

Vehicle displays irregular lateral deviation during lane-keeping (zig-zagging);

Vehicle did not respect traffic control device (stop sign, traffic light, etc.);

Vehicle did not respect priority at intersection;

Vehicle failed to properly execute preferred future travel path communicated to other VANET vehicles 110A-110n;

Driving Styles:
　Speeding;
　Irregular vehicular movement;
　Variable lateral positioning (zig-zagging);
　Tailgating/maintaining a short headway;
　Remaining in passing lane (i.e., left-most lane);
　Frequent overtaking;
　Frequent errors and/or violations;
　Inappropriate/excessive horn honking;
　Flashing headlights at other vehicles;
　Making inappropriate gestures to other vehicles/vehicle users;
　Communicating false or inaccurate safety information;
　Ignoring priority of other vehicles;

Indicators:
　Percentage of time exceeding speed limit;
　Percentage of time with jerking exceeds defined criterion;
　Percentage of time driving with insufficient headway between vehicles;
　Standard deviation from lane centerline exceeds criterion;
　Percentage of time driving in left lane;
　Honking rate exceeds defined criterion;
　Headlight flashing exceeds defined criterion;
　Number of boundary crossings into safety space of nearby vehicles;
　Inappropriate use of communications;

Measures:
　Speed;
　Longitudinal/lateral acceleration;
　Jerk;
　Time/distance headway;
　Lane choice;
　Lateral position in lane;
　Passing gap when overtaking;
　Mismatch between intentions and actions;
　Horn activation;
　High-beam flash activation;
　Improper use of signaling devices.

Figure 2B:
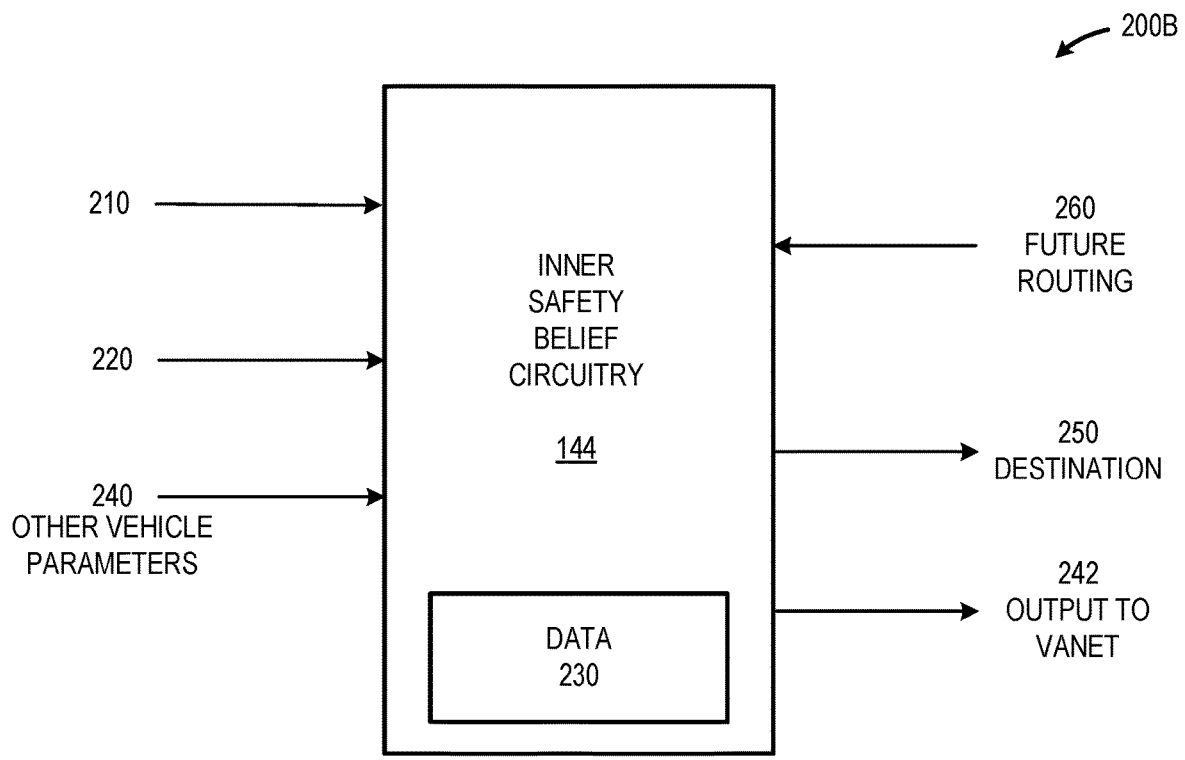
FIG. 2B is an input/output diagram depicting illustrative inner safety belief circuitry inputs and outputs, in accordance with at least one embodiment described herein.

FIG. 2B is an input/output diagram 200B depicting illustrative inner safety belief circuitry 144 inputs and outputs, in accordance with at least one embodiment described herein.

As depicted in FIG. 2B, the inner safety belief circuitry 144 receives the signal 210 that includes data representative of the host vehicle parameters and the signal 220 that includes data representative of the rogue vehicle parameters and/or behavior. In addition, the inner safety belief circuitry 144 also receives one or more signals 240 that include information and/or data associated with at least some of the other VANET vehicles 110.

The inner safety belief circuitry 144 receives the information associated with the host vehicle, information associated with one or more rogue vehicles identified by the host vehicle or by any other VANET vehicle 110, and information associated with the respective preferred future travel path for each of the VANET vehicles 110. The inner safety belief circuitry 144 includes circuitry capable of collating and/or organizing the received host vehicle, rogue vehicle, and VANET vehicle information. The inner safety belief circuitry 144 generates an output signal 250 that passes the collated and organized information along to the trajectory generation circuitry 146.

The inner safety belief circuitry 144 receives a proposed routing signal 260 from the trajectory generation circuitry 146. The inner safety belief circuitry 144 includes circuitry capable of determining whether the proposed future travel path for the host vehicle interferes with any of the proposed future travel paths received from the VANET vehicles 110. In addition, the inner safety belief circuitry 144 determines whether the proposed future travel path violates any of the safe vehicle operating behaviors 145 associated with the host vehicle. If the inner safety belief circuitry 144 determines the preferred future travel path generated by the trajectory generation circuitry 146 either causes a collision with any other VANET vehicles 110 or violates some or all of the safe vehicle operating behaviors 145 of the host vehicle, the inner safety belief circuitry 144 may cause the trajectory generation circuitry 146 to regenerate a preferred future travel path.

The inner safety belief circuitry 144 generates an output signal 242 that includes information indicative of the preferred future path of the host vehicle. The inner safety belief circuitry 144 communicates the output signal 242 to at least some of the VANET vehicles 110. In embodiments, the inner safety belief circuitry 144 multicasts the output signal 242 via the VANET 120 to the VANET vehicles 110.

Figure 2C:
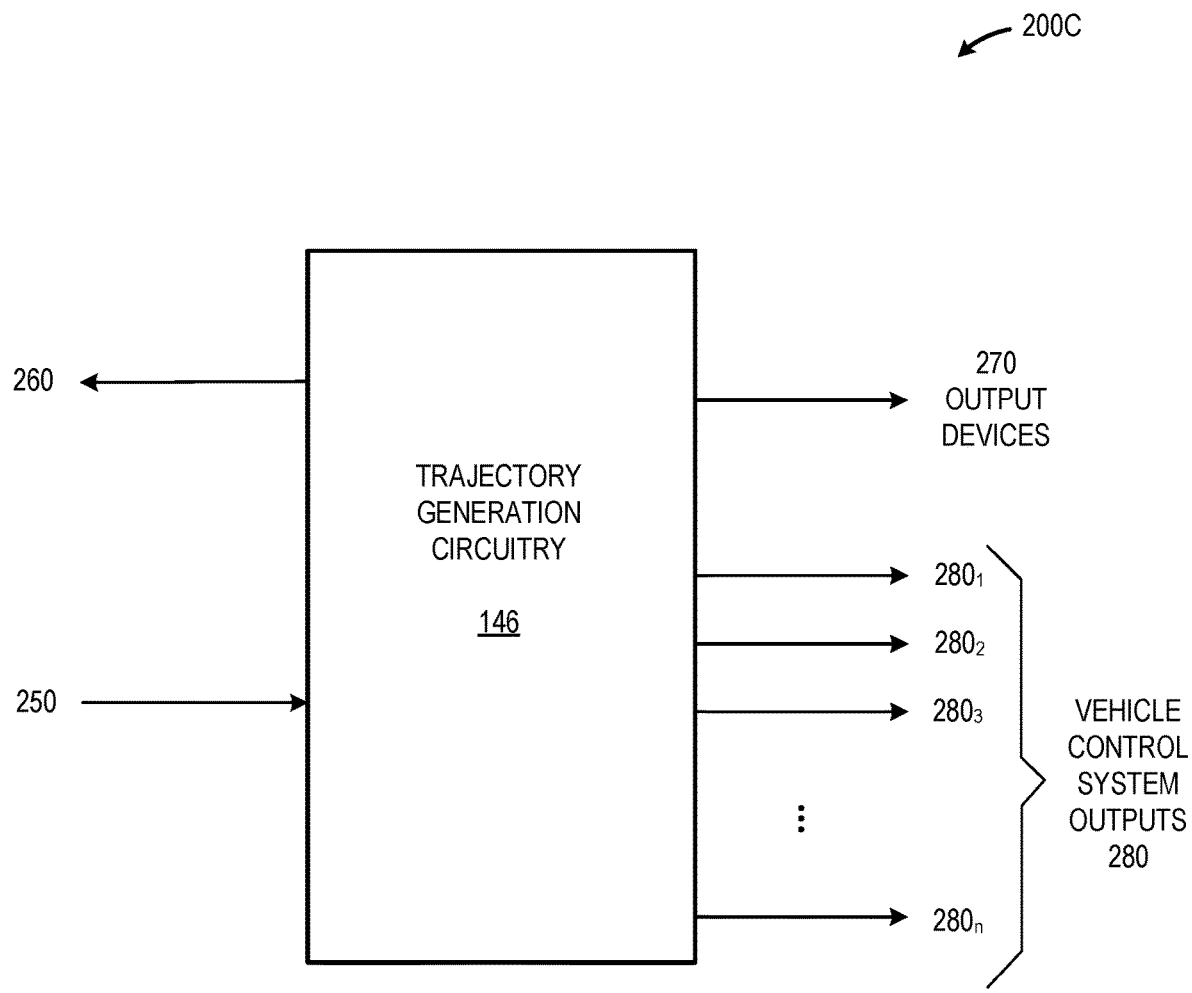
FIG. 2C is an input/output diagram depicting illustrative trajectory generation circuitry inputs and outputs, in accordance with at least one embodiment described herein.

FIG. 2C is an input/output diagram 200C depicting illustrative trajectory generation circuitry 146 inputs and outputs, in accordance with at least one embodiment described herein. As depicted in FIG. 2C, the trajectory generation circuitry 146 receives the output signal 250 generated by the inner safety belief circuitry 144. The trajectory generation circuitry 146 includes circuitry capable of generating a preferred future travel path based upon the information contained in the signal 250 provided by the inner safety belief circuitry 144. In embodiments, the trajectory generation circuitry 146 includes circuitry, such as a neural network, capable of determining a preferred future travel path based upon the safe vehicle operating behaviors 145 of the host vehicle and any rogue vehicle information and/or data received from the inner safety belief circuitry 144.

The trajectory generation circuitry 146 generates several output signals. The trajectory generation circuitry 146 includes circuitry capable of generating a first output signal 260 that includes information representative of the preferred future travel path determined by the trajectory generation circuitry 146. The trajectory generation circuitry 146 communicates the first output signal 260 to the inner safety belief circuitry 144. The trajectory generation circuitry 146 also includes circuitry capable of generating a second output signal 270 that includes data representative of human perceptible output (audio, visual, tactile, etc.). The trajectory generation circuitry 146 provides the second output signal 270 to one or more output devices, such as an in-vehicle infotainment system. The trajectory generation circuitry 146 also includes circuitry capable of generating a plurality of output signals 280A-280n (collectively, "output signals 280"). Each of the output signals 280 include information capable of causing a vehicle control system 174 to cause the vehicle to proceed along the determined preferred future travel path. In embodiments, each of the output signals 280 may be coupled to a vehicle control system 174, such as a steering system, an acceleration system, a braking system, an illumination system, a signaling system, and similar.

Figure 3:
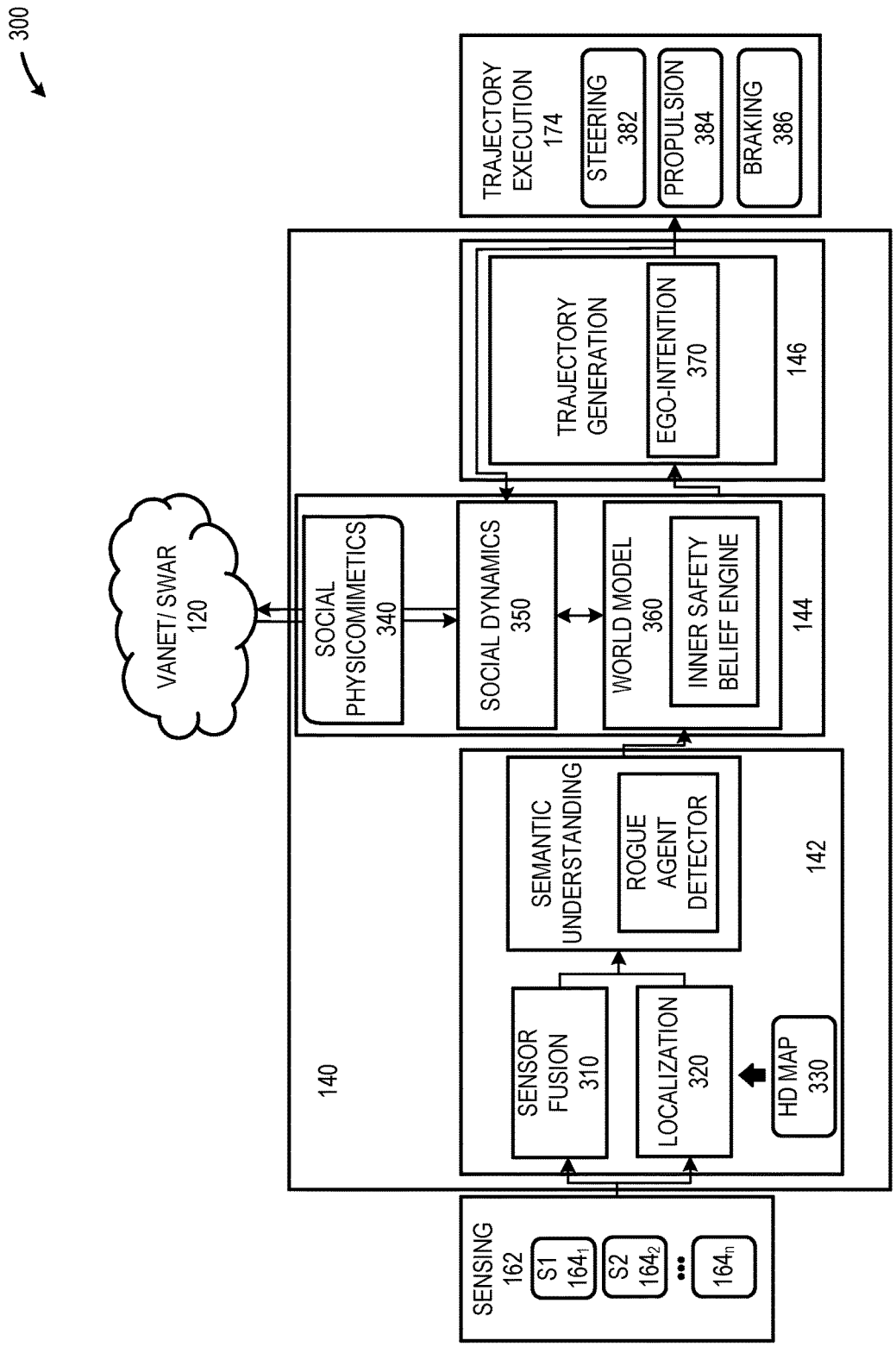
FIG. 3 is a block diagram of an illustrative rogue vehicle detection system used in an autonomous host vehicle, in accordance with at least one embodiment described herein.

FIG. 3 is a block diagram of an illustrative rogue vehicle detection system 300 used in an autonomous host vehicle, in accordance with at least one embodiment described herein. As depicted in FIG. 3, the rogue vehicle detection circuitry 142 may include sensor fusion circuitry 310 and localization circuitry 320 that receives high-definition map data from map data storage circuitry 330. The inner safety belief circuitry 144 includes social physicomimetics circuitry 340, social dynamics circuitry 350, and world model circuitry 360. The trajectory generation circuitry 146 includes ego-intention circuitry 370.

The sensor fusion circuitry 310 receives at least a portion of the signals provided by the sensors 164A-164n included in the sensor array 162. The sensor fusion circuitry 310 combines the information and/or data received from the sensors 164 forming the sensor array 162 such that the resulting combined information and/or data has less uncertainty than would be possible when signals provided by the sensors 164 forming the sensor array 162 were used individually. In embodiments, the sensor fusion circuitry 310 may employ any method or algorithm to combine the signals received from some or all of the sensors 164 included in the sensor array 162. Illustrative examples of sensor fusion methods or algorithms used by the sensor fusion circuitry 310 include: a central limit theorem (CLT); Kalman filtering; a Bayesian network; Dempster-Shafer theory (DST); and a convolutional neural network (CNN).

The localization circuitry 320 may receive at least a portion of the signals provided by the sensors 164A-164n include in the sensor array 162. In embodiments, the localization circuitry 320 receives information from one or more sensors 164 to accurately position the host vehicle within a mapped environment. For example, the localization circuitry 320 may use geolocation data (e.g., data obtained via GPS, GLONASS, Galileo positioning systems) obtained via one or more geolocation sensors/receivers 164 and/or image information obtained via one or more LIDAR sensors 164 and/or one or more image acquisition sensors 164 to locate the position of the host vehicle on a high-definition ("HD") map retrieved from the HD map storage circuitry 330. In embodiments, the HD map data may be provided by the vehicle manufacturer and may be periodically updated to reflect changes in transportation infrastructure.

The output from the sensor fusion circuitry 310 and the localization circuity 320 may be combined and provided to the rogue agent detection circuitry 340. The rogue agent detection circuitry 340 compares the combined data received from the sensor fusion circuitry 310 and the localization circuity 320 with information and/or data representative of safe vehicle operating behaviors 145. Nearby vehicles identified by the rogue agent detection circuitry 340 as operating in an unsafe, illegal, or in any manner non-compliant with the safe vehicle operating behaviors 145 as determined by the host vehicle are deemed "rogue vehicles" by the rogue agent detection circuitry 340. In embodiments, the rogue agent detection circuitry 340 may cause the transmission of performance, parametric, and/or behavioral information associated with the identified rogue vehicle to at least some of the VANET vehicles 110.

The output from the rogue vehicle detection circuitry 142 is passed to the inner safety belief circuitry 144. The inner safety belief circuitry 144 includes physicomimetics circuitry 340, social dynamics circuitry 350, and world model circuitry 360.

The physicomimetics circuitry 340 includes any number and/or combination of electrical components, semiconductor devices, and/or logic elements capable of providing circuitry to bidirectionally communicate information and/or data between each of at least some of the VANET vehicles 110. In embodiments, the information and/or data may be multi-casted by each of the other VANET vehicles 110 and may include: the preferred future travel path of the reporting VANET vehicle $110_x$; and information associated with a rogue vehicle identified by the reporting VANET vehicle $110_x$. The physicomimetics circuitry 340 circuitry also communicates information and/or data representative of the host vehicle's preferred future travel path and, if applicable, information associated with a rogue vehicle identified by the host vehicle. In embodiments, the information associated with a vehicle's preferred future travel path may include information representative of one or more of the following: vehicle location, vehicle velocity/velocity vector, front-vehicle distance, personal-best vector, and a local driving condition identifier. In embodiments, the information communicated across the VANET 120 and associated with a rogue vehicle may include information representative of one or more of the following: a location of the rogue vehicle; a velocity/velocity vector of the rogue vehicle; the conflicted inner safety belief that caused the vehicle to be identified as a rogue vehicle.

The social dynamics circuitry 350 includes any number and/or combination of electrical components, semiconductor devices, and/or logic elements capable of providing circuitry to translate messages including performance information, parametric information, behavioral information, and/or preferred future travel path information associated with the host vehicle and received from the inner safety belief circuitry 144 to a format suitable for multicast transmission to some or all of the VANET vehicles 110. In addition, the social dynamics circuitry 250 includes any number and/or combination of electrical components, semiconductor devices, and/or logic elements capable of providing circuitry to translate received messages including performance information, parametric information, behavioral information, and/or preferred future travel path information associated with one or more other VANET vehicles 110 to a format suitable for transfer to the inner safety belief circuitry 144 carried by the host vehicle.

The world model circuitry 360 includes any number and/or combination of electrical components, semiconductor devices, and/or logic elements that, when combined, provide circuitry to receive one or more signals 210 that include host vehicle information and one or more signals 220 that include rogue vehicle information from the rogue vehicle detection and avoidance circuitry 142. In addition, the world model circuitry 360 includes circuitry to receive one or more signals 240 that include information obtained from other VANET vehicles 110. The world model circuitry 360 assimilates, coordinates, and/or collates the received information and passes the information along to the trajectory generation circuitry 146 via the inner safety belief circuitry 144. Thus, the inner safety belief circuitry 144 passes one or more signals 250 that include: host vehicle behavioral rules; VANET vehicle preferred future paths; and information associated with rogue vehicles identified by the host vehicle or by any other VANET vehicles. Upon receipt of the one or more signals 250, the trajectory generation circuitry 146 determines a preferred future travel path for the host vehicle. The trajectory generation circuitry 146 provides a signal 260 that includes host vehicle preferred future travel path information (routing, speed, etc.) to the inner safety belief circuitry 144. The inner safety belief circuitry 144 uses the information included in the signal 260 to confirm that the proposed host vehicle preferred future travel path determined by the trajectory generation circuitry 146 has not been impacted (e.g., result in a collision with another vehicle) by any subsequently received VANET vehicle preferred future travel path. The output signal 250 from the inner safety belief circuitry 144 is provided to the ego-intention circuitry 270 portion of the trajectory generation circuitry 146.

The ego-intention circuitry 270 includes any number and/or combination of electrical components, semiconductor devices, and/or logic elements that, when combined, provide circuitry to generate a preferred future travel path for the host vehicle, communicate the preferred future travel path to the inner safety belief circuitry 144, and generate one or more output signals 280 to alter, adjust, control, or otherwise vary the output of one or more vehicular systems 174. In embodiments, the ego-intention circuitry 270 receives one or more signals that include: the host vehicle safe vehicle operating behaviors 145; the host vehicle location and/or performance information; location and/or performance information associated with any number of the plurality of VAVET vehicles 110; and location and/or performance information associated with each identified rogue vehicle. Using the received information, the ego-intention circuitry 270 determines the preferred future travel path for the host vehicle. In embodiments, the ego-intention circuitry 270 may determine the preferred future travel path based on one or more of: collision avoidance with other VANET vehicles 110; maximizing the distance between the host vehicle and identified rogue vehicles; minimizing the travel distance of the preferred future travel path; minimizing the transit time of the preferred future path; or combinations thereof.

As depicted in FIG. 3, the ego-intention circuitry 270 generates one or more output signals 280 that alter, adjust, or otherwise control one or more systems in the host vehicle. For example, the ego-intention circuitry 270 may generate one or more signals to control: the output of the host vehicle guidance system 382 (e.g., steering); the output of the host vehicle propulsion system 384; and/or the output of the host vehicle braking system 386.

Figure 4:
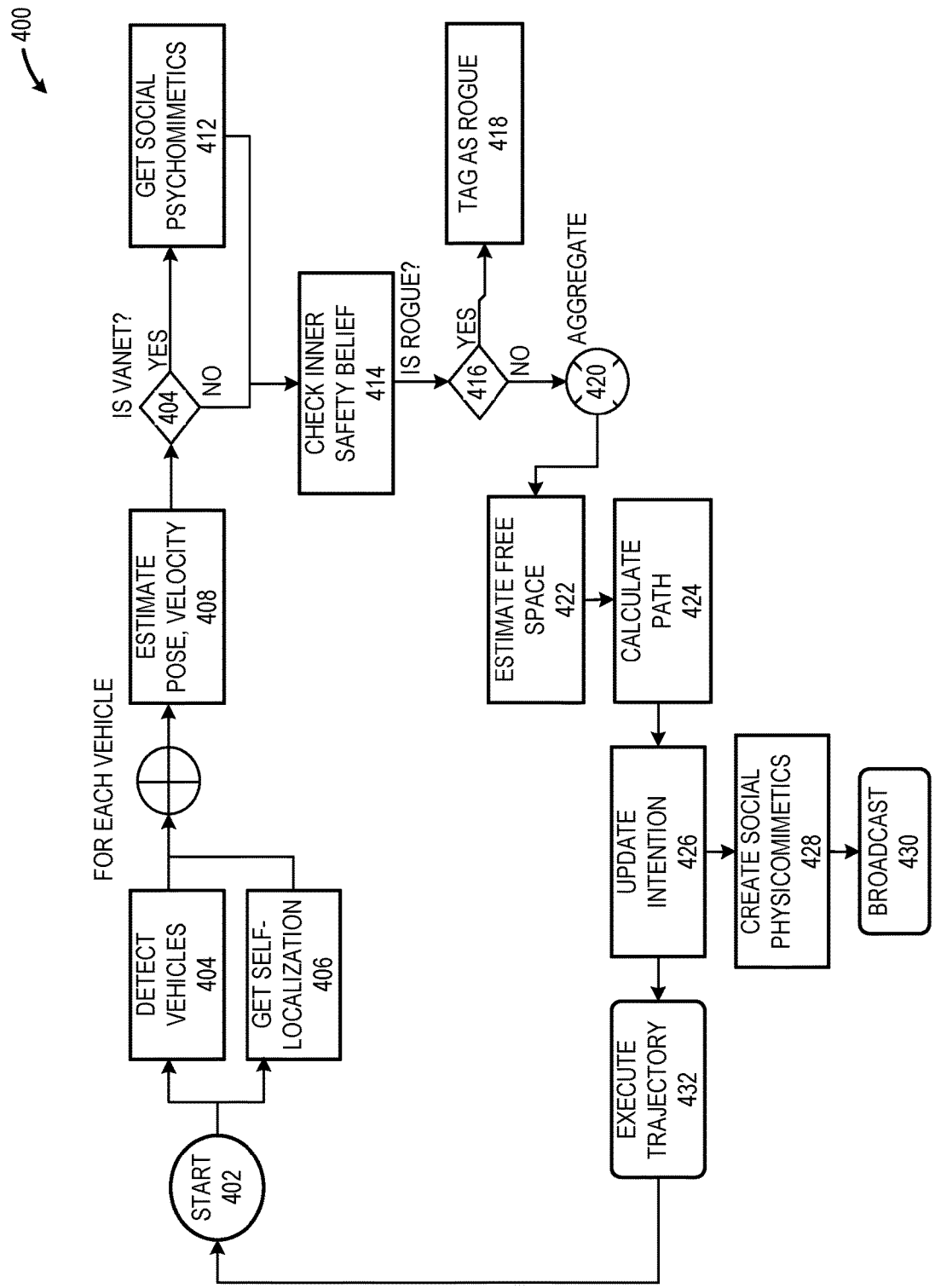
FIG. 4 is a flow diagram of an illustrative rogue vehicle detection method used in an autonomous host vehicle having a rogue vehicle detection system such as depicted in FIG. 3, in accordance with at least one embodiment described herein.

FIG. 4 is a flow diagram of an illustrative rogue vehicle detection method 400 used in an autonomous host vehicle having a rogue vehicle detection system such as depicted in FIG. 3, in accordance with at least one embodiment described herein. At the start 402, each of the sensors 164 included in the sensor array 162 communicate signals to the rogue vehicle detection and avoidance circuitry 142. At 404, the rogue vehicle detection and avoidance circuitry 142, using at least a portion of the information included in the sensor signals 202, detects other nearby vehicles. At 406, the rogue vehicle detection and avoidance circuitry 142, using at least a portion of the information included in the sensor signals 202 also determines the location of the host vehicle either on a relative basis (e.g., relative to one or more nearby vehicles, relative to a landmark, relative to the road surface, or similar) or on an absolute basis (e.g., geolocation, triangulation, or similar).

At 408, for each detected nearby vehicle, the rogue vehicle detection circuitry 142 determines the location, pose (e.g., direction of travel, location of one or more vehicular axes with respect to a fixed coordinate system, or similar), and velocity of the respective vehicle. At 410, the rogue vehicle detection circuitry 142 determines whether each detected vehicle is coupled to the VANET 120 (i.e., makes the determination of whether the respective vehicle is a VANET vehicle 110). If the respective vehicle is a VANET vehicle 110, at 412 the inner safety belief circuitry 144 obtains the social physicomimetics information associated with the respective vehicle. If the respective vehicle is not a VANET vehicle 110 or after the inner safety belief circuitry 144 retrieves the physicomimetics information associated with the respective vehicle at 412, at 414 the rogue vehicle detection circuitry 142 obtains or otherwise acquires the safe vehicle operating behaviors 145 from the inner safety belief circuitry 144. Using the acquired safe vehicle operating behaviors 145, the rogue vehicle detection circuitry 142 determines whether the respective nearby vehicle is a rogue vehicle. If the rogue vehicle detection circuitry 142 determines the respective vehicle is not compliant with one or more safe vehicle operating behaviors 145, at 418 the rogue vehicle detection circuitry 142 identifies or otherwise classifies the respective vehicle as a "rogue vehicle." The rogue vehicle detection circuitry 142 repeats 408 through 418 for each detected nearby vehicle.

After determining whether each nearby vehicle is a rogue vehicle, at 422, the trajectory generation circuitry 146 determines the space between the host vehicle and each nearby vehicle. Using the determined spacing information between the host vehicle and the nearby vehicles, the trajectory generation circuitry 146 generates the preferred future travel path for the host vehicle at 424. At 426, the inner safety belief circuitry 144 updates the intention of the host vehicle to follow the determined preferred future travel path to determine whether any information received subsequent to the determination of the preferred future travel path by the trajectory generation circuitry 146 affects the preferred future travel path. At 428 the inner safety belief circuitry 144 generates the social physicomimetics associated with the host vehicle and communicates the social physicomimetics, including the preferred future travel path of the host vehicle to the VANET vehicles 110. At 432 the trajectory generation circuitry 146 causes the vehicle to execute the instructions that cause the host vehicle to travel along the determined preferred future travel path.

Figure 5:
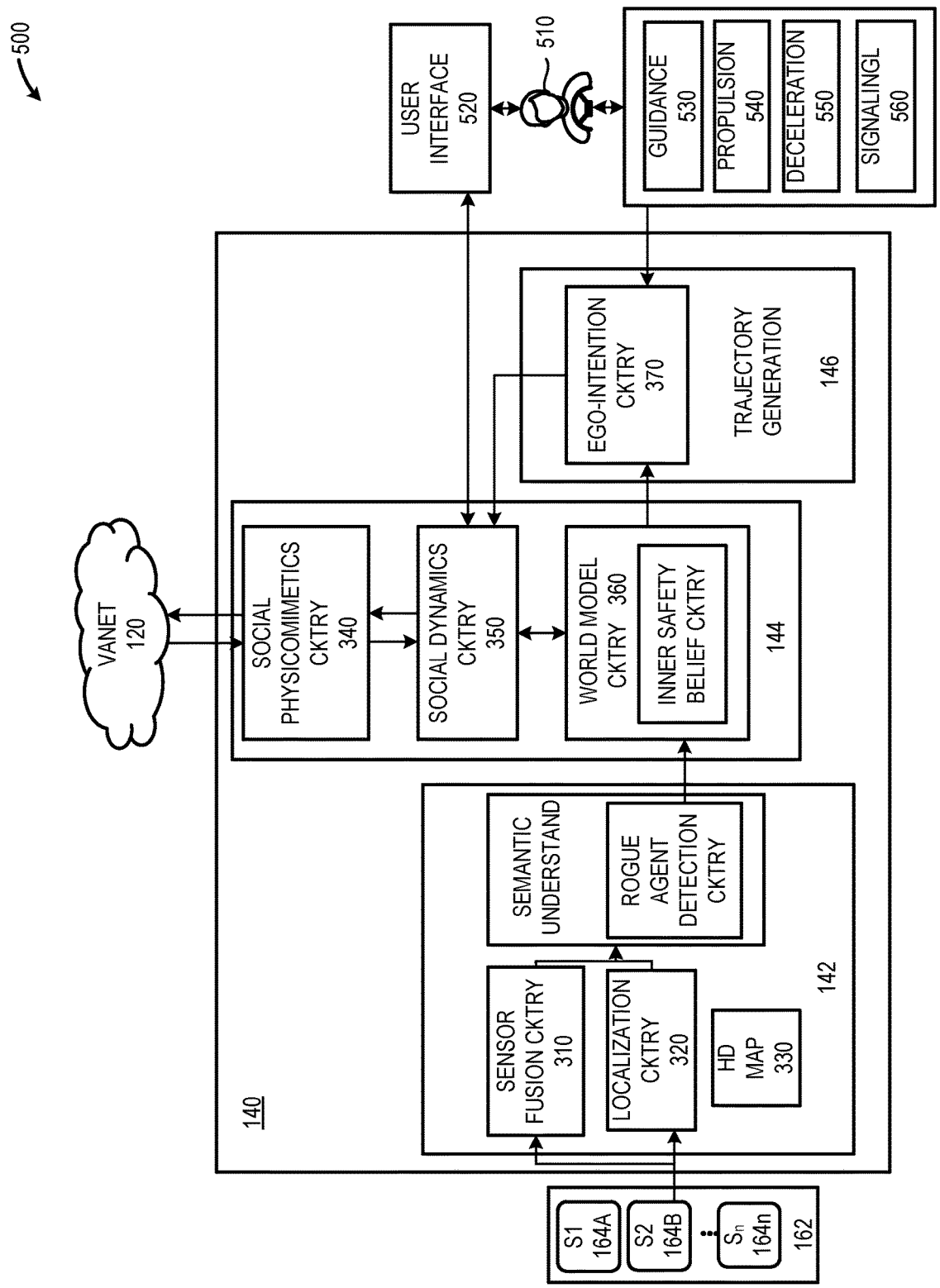
FIG. 5 is a block diagram of an illustrative rogue vehicle detection system used in an semi-autonomous host vehicle, in accordance with at least one embodiment described herein.

FIG. 5 is a block diagram of an illustrative rogue vehicle detection system 500 used in an semi-autonomous host vehicle, in accordance with at least one embodiment described herein. As depicted in FIG. 5, instead of providing output signals to a plurality of host vehicle systems, the ego-intention circuitry 370 instead receives a plurality of signals from each of the plurality of host vehicle systems. The ego-intention circuitry 370 generates the preferred future travel path using the information included in one or more output signals provided by the inner safety belief circuitry 144. Instead of controlling one or more host vehicle systems 174, the ego-intention circuitry 370 instead generates an output signal 270 that includes information and/or data representative of the determined preferred future travel path. The information and/or data representative of the determined preferred future travel path is then presented to a user 510 via one or more output devices 520, such as a display that provides a user interface for the host vehicle operator 510.

In embodiments, one or more host vehicle systems may provide input signals to the ego-intention circuitry 270. The host vehicle guidance system 530 may provide to the ego-intention circuitry 370 an input signal containing information and/or data representative of a guidance input (e.g., steering) provided by the host vehicle operator 510. The host vehicle propulsion system 540 may provide to the ego-intention circuitry 370 an input signal containing information and/or data representative of a propulsion input (e.g., throttle, accelerator position, fuel flow, battery supply current) provided by the host vehicle operator 510. The host vehicle deceleration or braking system 550 may provide to the ego-intention circuitry 370 an input signal containing information and/or data representative of a deceleration or braking input (e.g., throttle, accelerator position, regenerative braking, and similar) provided by the host vehicle operator 510. The host vehicle signaling system 560 may provide to the ego-intention circuitry 370 an input signal containing information and/or data representative of a signaling input (e.g., turn signals, brake lights, headlights) provided by the host vehicle operator 510.

Figure 6:
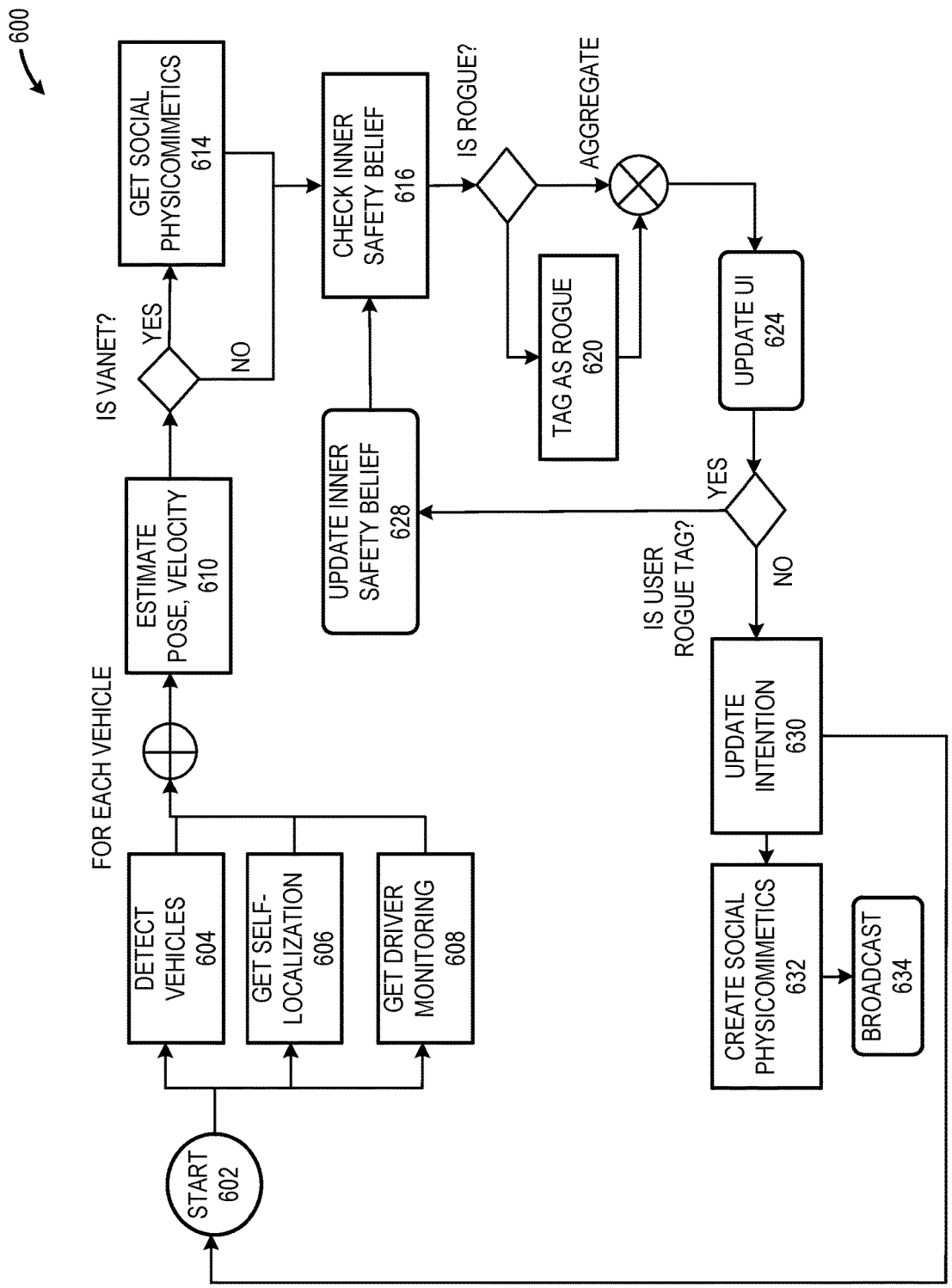
FIG. 6 is a flow diagram of an illustrative rogue vehicle detection method used in an semi-autonomous or manually controlled host vehicle having a rogue vehicle detection system such as depicted in FIG. 5, in accordance with at least one embodiment described herein.

FIG. 6 is a flow diagram of an illustrative rogue vehicle detection method 600 used in an semi-autonomous or manually controlled host vehicle having a rogue vehicle detection system such as depicted in FIG. 5, in accordance with at least one embodiment described herein. At the start 602, each of the sensors 164 included in the sensor array 162 communicate signals to the rogue vehicle detection and avoidance circuitry 142. At 604, using at least a portion of the information included in the signals 202 received from the sensor array 162, the rogue vehicle detection circuitry 142 detects other nearby vehicles. The detected vehicles may be under autonomous control, semi-autonomous control, or manual control. At 606, using at least a portion of the information included in the signals 202 received from the sensor array 162, the rogue vehicle detection circuitry 142 determines the location of the host vehicle. In some embodiments, the rogue vehicle detection circuitry 142 may determine the location of the host vehicle on a relative basis (e.g., relative to one or more nearby vehicles, relative to a landmark, relative to the road surface, or similar). In other embodiments, the rogue vehicle detection circuitry 142 may determine the location of the host vehicle using an absolute coordinate system (e.g., latitude and longitude) using geolocation, triangulation, or similar. At 608, using at least a portion of the information included in the signals 202 received from the sensor array 162, the rogue vehicle detection circuitry 142 determines one or more parameters associated with an occupant or user of the host vehicle. Such vehicle occupant or user parameters may include: hand position, hand gestures, facial gestures, eye tracking, eye detection, voice recognition, and similar.

At 610, for each detected nearby vehicle, the rogue vehicle detection circuitry 142 determines the location, pose (e.g., direction of travel, location of one or more vehicular axes with respect to a fixed coordinate system, or similar), and velocity of the respective vehicle. At 612, the rogue vehicle detection circuitry 142 determines whether each detected nearby vehicle is coupled to the VANET 120 (i.e., makes the determination of whether the respective vehicle is a VANET vehicle 110). If the respective vehicle is a VANET vehicle 110, at 614 the inner safety belief circuitry 144 obtains the social physicomimetics information broadcast by the respective VANET vehicle 110. If the respective vehicle is not a VANET vehicle 110 or subsequent to the inner safety belief circuitry 144 retrieving the physicomimetics information associated with the respective vehicle at 614, at 616 the rogue vehicle detection circuitry 142 obtains or otherwise acquires the safe vehicle operating behaviors 145 from the inner safety belief circuitry 144 and determines whether the respective nearby vehicle is a rogue vehicle that is not compliant with one or more host vehicle safe vehicle operating behaviors 145. If the rogue vehicle detection circuitry 142 determines the respective nearby vehicle is not compliant with one or more host vehicle safe vehicle operating behaviors 145, at 620 the rogue vehicle detection circuitry 142 identifies the respective nearby vehicle as a rogue vehicle. The rogue vehicle detection circuitry 142 repeats 610 through 620 for each detected nearby vehicle.

After determining whether each nearby vehicle is a rogue vehicle, at 624, the trajectory generation circuitry 146 generates one or more output signals that include information and/or data for presentation to the vehicle operator. For example, the trajectory generation circuitry 146 may generate one or more output signals containing display information that are communicated across the host vehicle CAN-BUS for presentation to a vehicle operator via a vehicle infotainment system. In embodiments, at 628 the inner safety belief circuitry 144 updates the safe vehicle operating behaviors 145 using some or all of the information received or otherwise obtained from at least a portion of the VANET vehicles 110. In embodiments, at 628 the inner safety belief circuitry 144 updates the safe vehicle operating behaviors 145 using some or all of the information received from at least a portion of the sensors 164 included in the sensor array 162, the inner safety belief circuitry 144 updates the safe vehicle operating behaviors 145. In some embodiments, at 628 the inner safety belief circuitry 144 updates the safe vehicle operating behaviors 145 using information received from one or more stationary sources and/or vehicular infrastructure sources (e.g., roadside broadcast stations, Internet-based vehicular data accumulators, and similar).

At 630, the inner safety belief circuitry 144 may update the preferred future travel path of the host vehicle. In embodiments, the preferred future travel path may be based on the location, pose, and/or velocity of the host vehicle. At 632, the inner safety belief circuitry 144 updates the social physicomimetics associated with the host vehicle based upon performance parameters and behaviors of the host vehicle. At 634, the inner safety belief circuitry 144 broadcasts the host vehicle social physicomimetics via the VANET 120 to one or more VANET vehicles.

Figure 7:
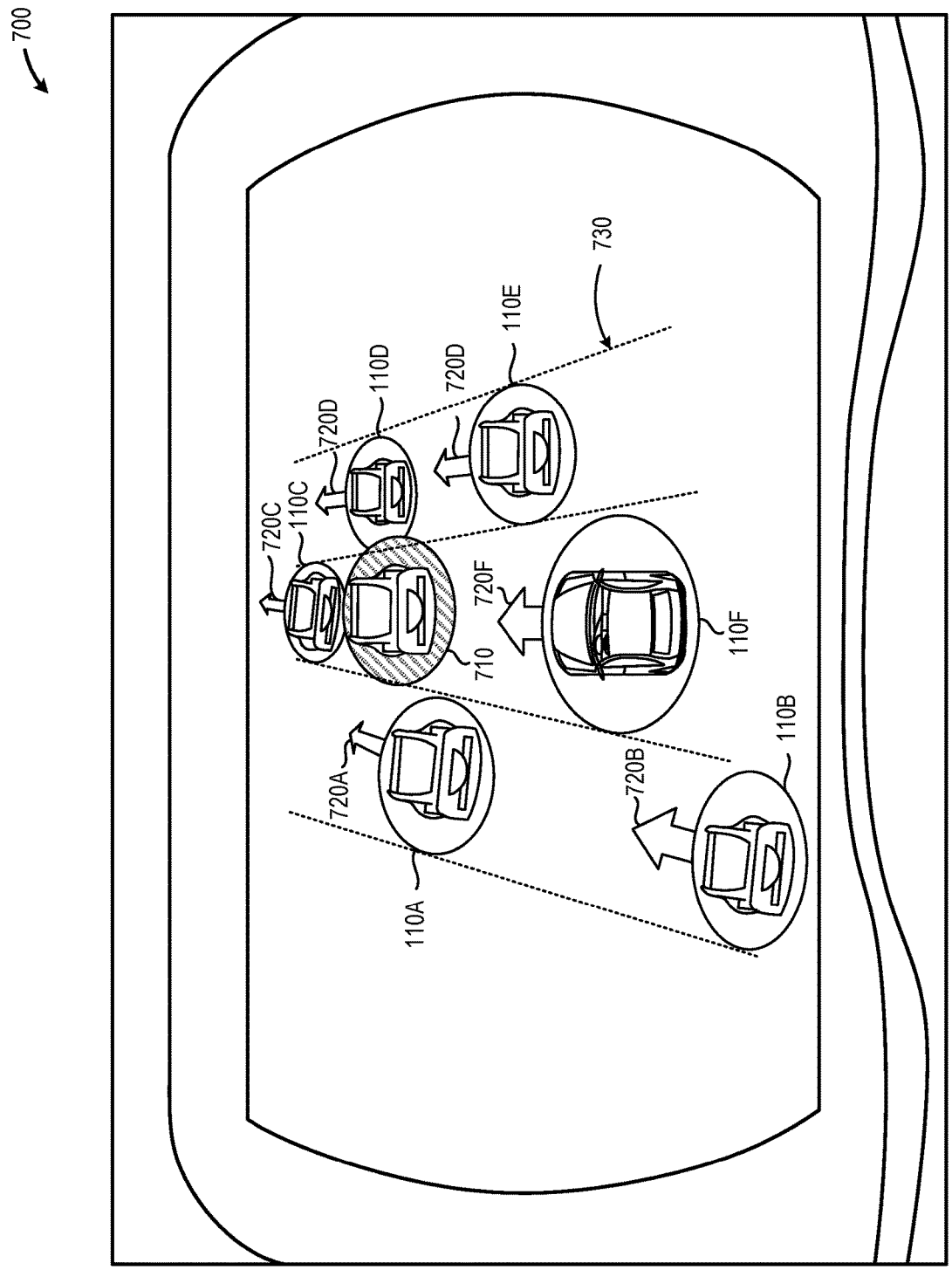
FIG. 7 is an illustrative graphical output display provided to an operator of a semi-autonomous or manually controlled vehicle that includes a rogue vehicle detection system such as depicted and described in detail in FIG. 1, in accordance with at least one embodiment described herein.

FIG. 7 is an illustrative graphical output display 700 provided to an operator of a semi-autonomous or manually controlled vehicle that includes a rogue vehicle detection system 130 such as depicted and described in detail in FIG. 1, in accordance with at least one embodiment described herein. The graphical output display 700 may be generated by the trajectory generation circuitry 146 based on physicomimetics information from other VANET vehicles 110A-110F that is received by inner safety belief circuitry 144 carried by the host vehicle 710. As depicted in FIG. 7, each of the VANET vehicles 110A-110F is displayed on a graphical output that includes a three-lane roadway 730. The host vehicle 710 (depicted with a cross-hatched surrounding bubble) is traveling in the center lane of the three-lane roadway 730.

Based on the received preferred future travel path information, social dynamic information, and/or physicomimetics information provided by each of the VANET vehicles 110A-110F, the trajectory generation circuitry 146 in the host vehicle 710 generates a graphical output that shows the location of each VANET vehicle and the preferred future travel path 720A-720F for each of VANET vehicles 110A-110F. In embodiments, the trajectory generation circuitry 146 may cause the display of additional VANET vehicle data on the graphical output display 700. For example, the trajectory generation circuitry 146 may cause the display of distance data between the host vehicle 710 and selected VANET vehicles 110A-110F on the graphical output display 700. In another example, the trajectory generation circuitry 146 may cause the selective display of velocity and/or acceleration for VANET vehicles 110A-110F as text or in a graphical format. In yet another example, based on the received physicomimetics information, the trajectory generation circuitry 146 may cause the graphical output display to selectively depict braking or stopping distances associated with each of at least some of the VANET vehicles 110A-110F, for example by depicting a circle about each VANET vehicle that is proportionate to the projected stopping distance for the respective VANET vehicle 110.

Figure 8:
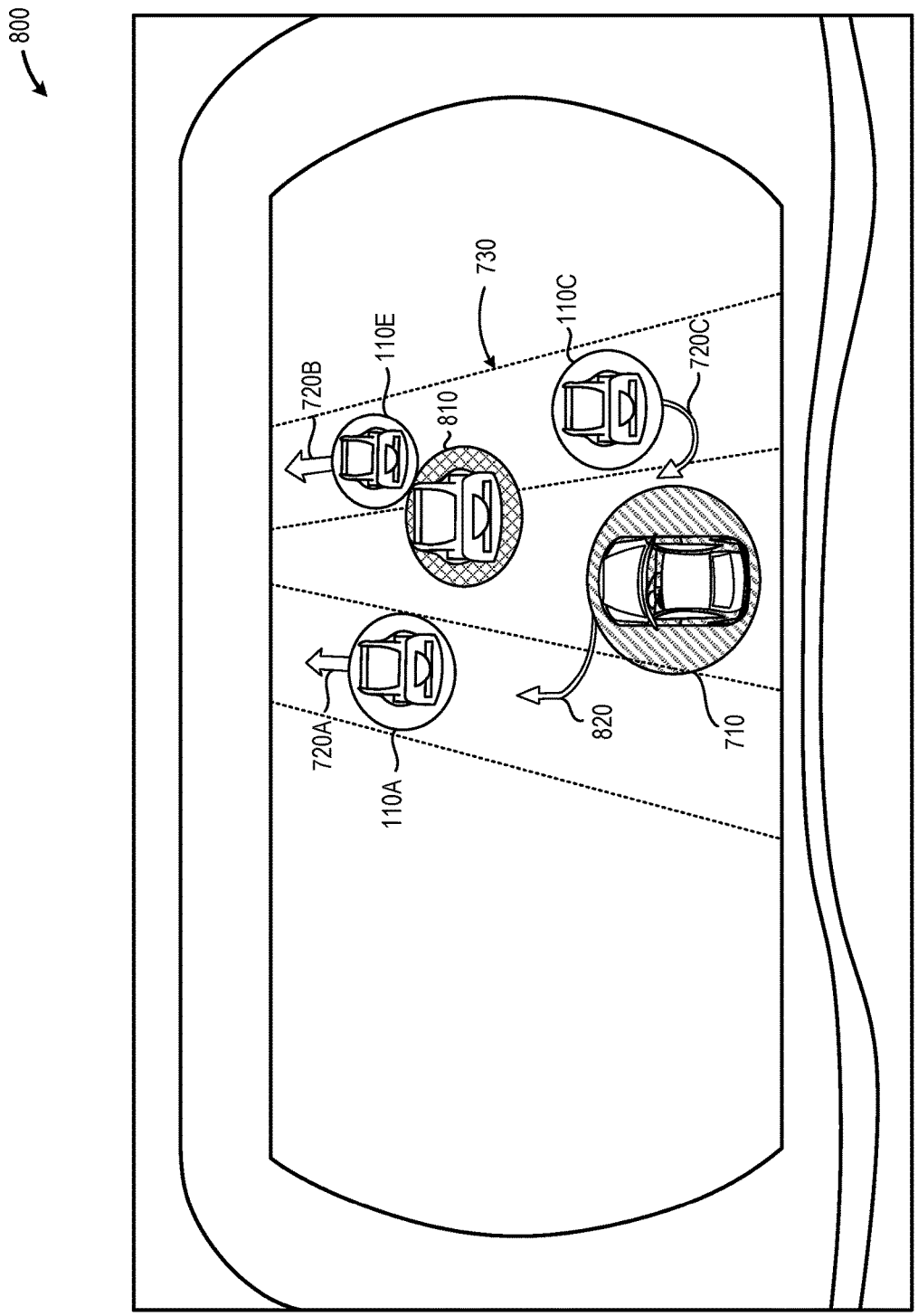
FIG. 8 is an illustrative graphical output display provided to an operator of a semi-autonomous or manually controlled vehicle that includes a rogue vehicle detection system such as depicted and described in detail in FIG. 1, in accordance with at least one embodiment described herein.

FIG. 8 is an illustrative graphical output display 800 provided to an operator of a semi-autonomous or manually controlled vehicle that includes a rogue vehicle detection system 130 such as depicted and described in detail in FIG. 1, in accordance with at least one embodiment described herein. As depicted in FIG. 8, vehicles identified as rogue vehicles 810 may be depicted in the graphical output display 800. The graphical output display 800 may be generated by the trajectory generation circuitry 146 based on physicomimetics information from other VANET vehicles 110A-110C that is received by inner safety belief circuitry 144 carried by the host vehicle 710. As depicted in FIG. 8, each of the VANET vehicles 110A-110C is displayed on a graphical output that includes a three-lane roadway 730. The host vehicle 710 (in a hatched surrounding bubble) is traveling in the center lane of the three-lane roadway 730. An identified rogue vehicle 810 (in a cross-hatched surrounding bubble) is depicted as drifting from the center lane to the right-most lane of the roadway 730.

As depicted in FIG. 8, the rogue vehicle 810 has been identified by one or more of the VANET vehicles 110A-110C and the preferred future travel path of each vehicle 720A-720C reflects an attempt by the respective vehicle to increase the distance or separation between the respective vehicle 110A-110C and the rogue vehicle 810. In the example depicted in FIG. 8, arrows 720A and 720B indicate the trajectory generation circuitry 146 in each of VANET vehicles 110A and 110B will cause the vehicles to accelerate away from the rogue vehicle 810. Similarly, arrow 720C indicates the trajectory generation circuitry 146 in vehicle 110C will cause the vehicle to change lanes in an attempt to increase the distance or separation between vehicle 110C and the rogue vehicle 810.

As depicted in FIG. 8, the trajectory generation circuitry 146 in the host vehicle 710 has indicated a preferred future path that takes the host vehicle 710 from the center lane to the left-most lane of the roadway 730. If the host vehicle 710 were a fully autonomous vehicle, the trajectory generation circuitry 146 would cause the host vehicle to autonomously shift from the center lane to the left-most lane of the roadway 730. Since the host vehicle 710 is under semi-autonomous or manual control, the graphical user interface provides an indication of the preferred future travel path 820 that the host vehicle operator may follow.

Figure 9:
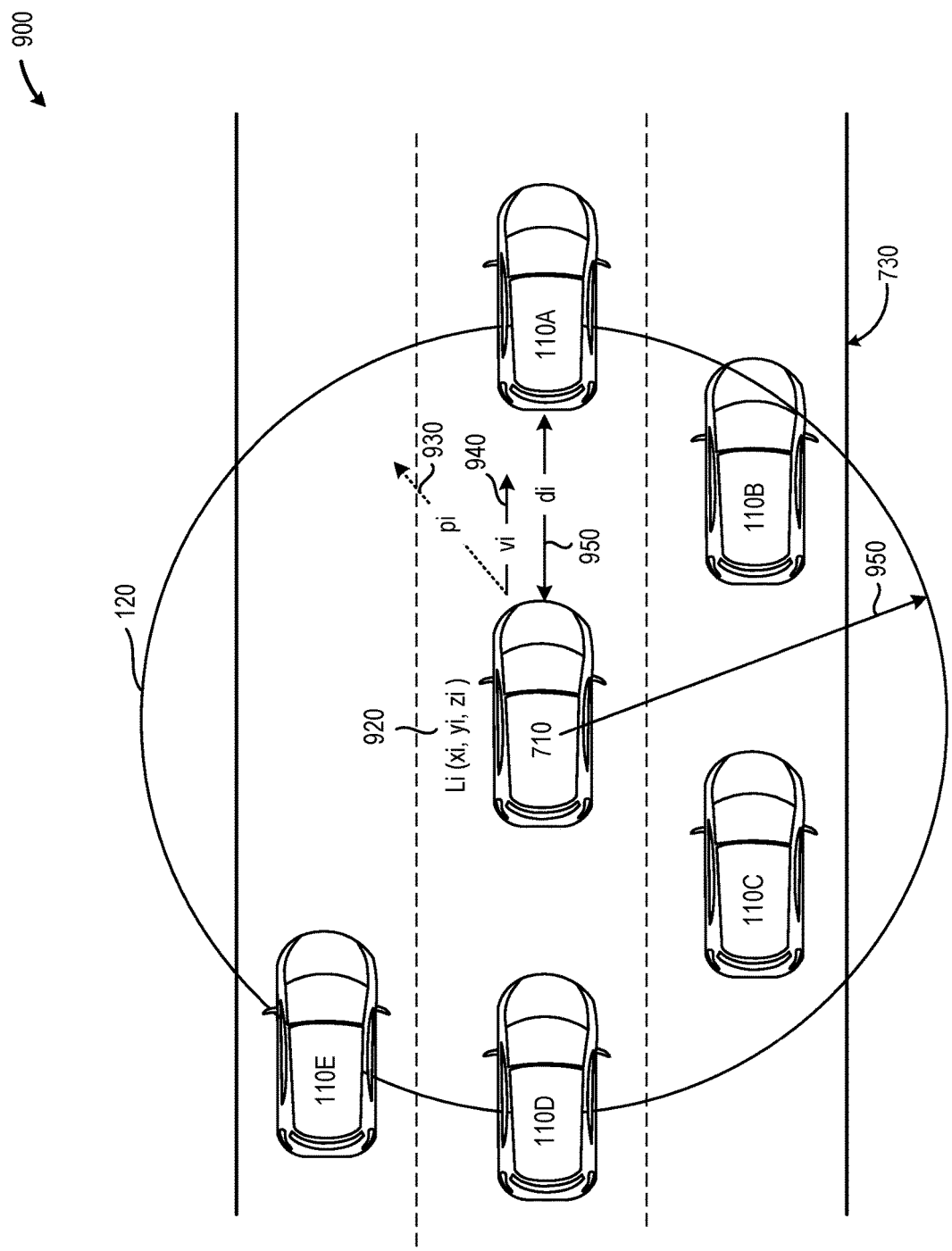
FIG. 9 is a plan view of an illustrative vehicle swarm that includes a plurality of vehicles coupled to a VANET, in accordance with at least one embodiment described herein.

FIG. 9 is a plan view of an illustrative vehicle swarm that includes a plurality of vehicles 110A-110E coupled to a VANET 120, in accordance with at least one embodiment described herein. As depicted in FIG. 9, the host vehicle 710 generates a VANET 120 that extends a range (i.e., a radius) 910 about the host vehicle 710. Vehicles 110A-110E within the range 910 of the VANET 120 are able to bidirectionally communicate with the host vehicle 710 via the VANET 120. In embodiments, the VANET 120 may have a range 910 of: about 5 meters; about 10 meters; about 15 meters; about 25 meters; about 50 meters; about 100 meters; or about 500 meters from the host vehicle 710.

In embodiments, the host vehicle 710 may communicate social physicomimetics such as vehicle performance parameters and/or vehicle behaviors to the other vehicles 110A-110E coupled to the VANET 120. As depicted in FIG. 9, the inner safety belief circuitry 144 communicates via multicast information and/or data associated with the host vehicle 710 to the nearby VANET vehicles 110. For example, the host vehicle inner safety belief circuitry 144 may communicate, via multicast, a location $[L_i(x_i, y_i, z_i)]$ of the host vehicle 710 as determined by a global positioning signal to the nearby VANET vehicles 110. The host vehicle inner safety belief circuitry 144 may communicate, via multicast, a velocity vector (direction and magnitude), $v_i$, associated with the host vehicle 710 to the nearby VANET vehicles 110. The host vehicle inner safety belief circuitry 144 may communicate, via multicast, a distance vector, $d_i$, between the host vehicle 710 and one or more nearby vehicles 110A. The host vehicle inner safety belief circuitry 144 may communicate, via multicast, a minimum reaction time, $Rt_i$, (not depicted in FIG. 9) between the host vehicle 710 and one or more nearby vehicles 110A. The host vehicle inner safety belief circuitry 144 may communicate, via multicast, the preferred future travel path, $p_i$, determined by the trajectory generation circuitry 146 of the host vehicle 710.

Figure 10:
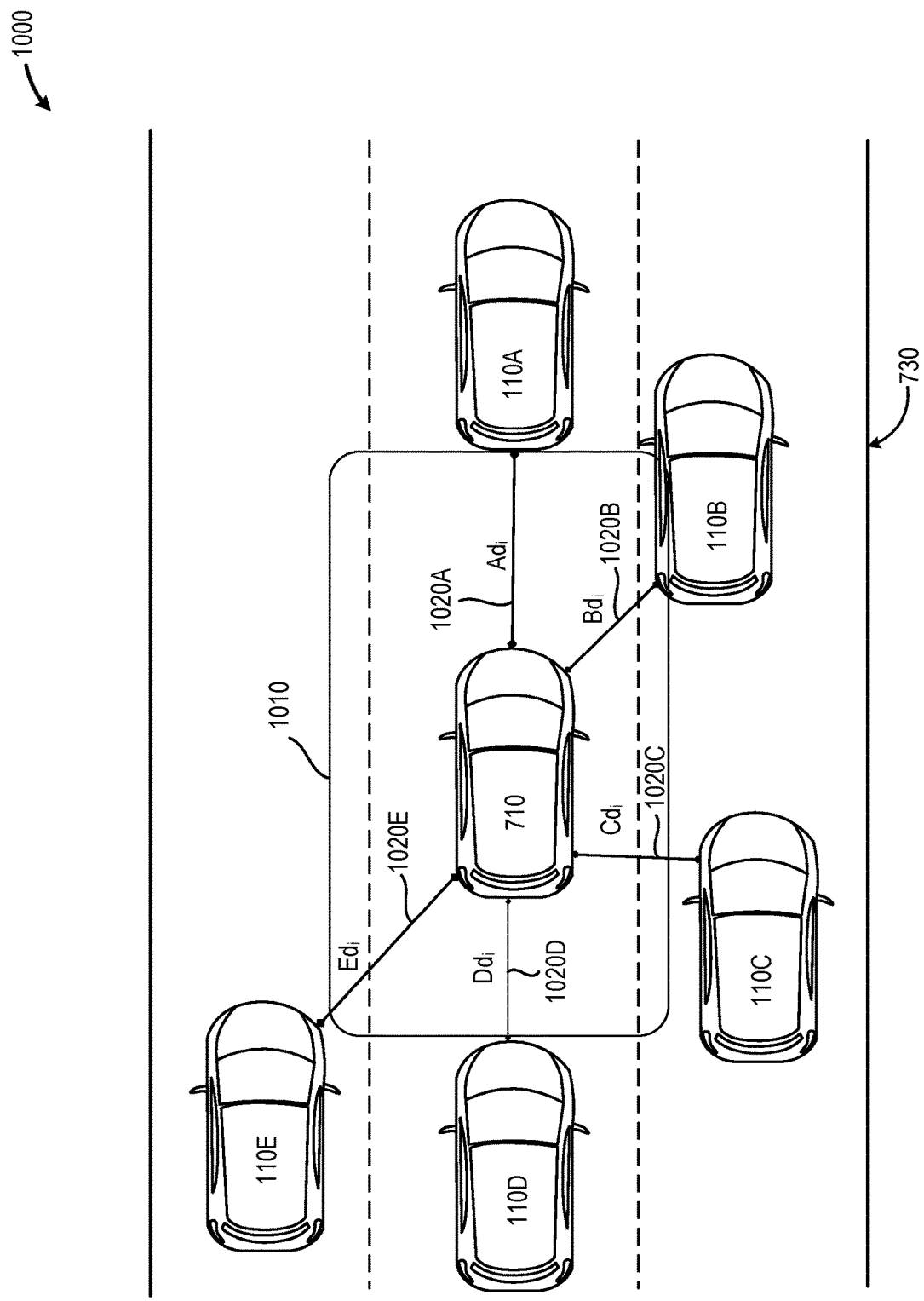
FIG. 10 is a plan view of a system that includes an illustrative vehicle swarm formed by a plurality of vehicles coupled to a VANET, in accordance with at least one embodiment described herein.

FIG. 10 is a plan view of a system 1000 that includes an illustrative vehicle swarm formed by a plurality of vehicles 110A-110E coupled to a VANET 120, in accordance with at least one embodiment described herein. As depicted in FIG. 10, the inner safety belief circuitry 146 of the host vehicle 710 establishes a safety perimeter 1010 about the host vehicle 710. As long as nearby vehicles 110A-110E are outside the safety perimeter 1010, the inner safety belief circuitry 146 and the trajectory generation circuitry 146 do not cause the host vehicle 710 to take evasive action to maintain the safety perimeter 1010 about the host vehicle 710. As depicted in FIG. 10, the distance 1020A between the host vehicle and vehicle 110A ($Ad_i$), the distance 1020C between the host vehicle and vehicle 110C ($Cd_i$), the distance 1020D between the host vehicle and vehicle 110D ($Dd_i$), and the distance 1020E between the host vehicle and vehicle 110E ($Ed_i$) cause the respective vehicles to fall outside of the safety perimeter 1010 of the host vehicle 710. However, the distance 1010B between the host vehicle 710 and vehicle 110B ($Bd_i$) causes vehicle 110B to fall within the safety perimeter 1010 of the host vehicle 710. Based on the decreased distance 1020B between the host vehicle 710 and vehicle 110B, the trajectory generation circuitry 146 will generate a trajectory generation circuitry 146 that attempts to increase the distance between the host vehicle 710 and vehicle 110B such that the distance 1020B to vehicle 110B causes vehicle 110B to fall outside of the host vehicle safety perimeter 1010.

Figure 11A:
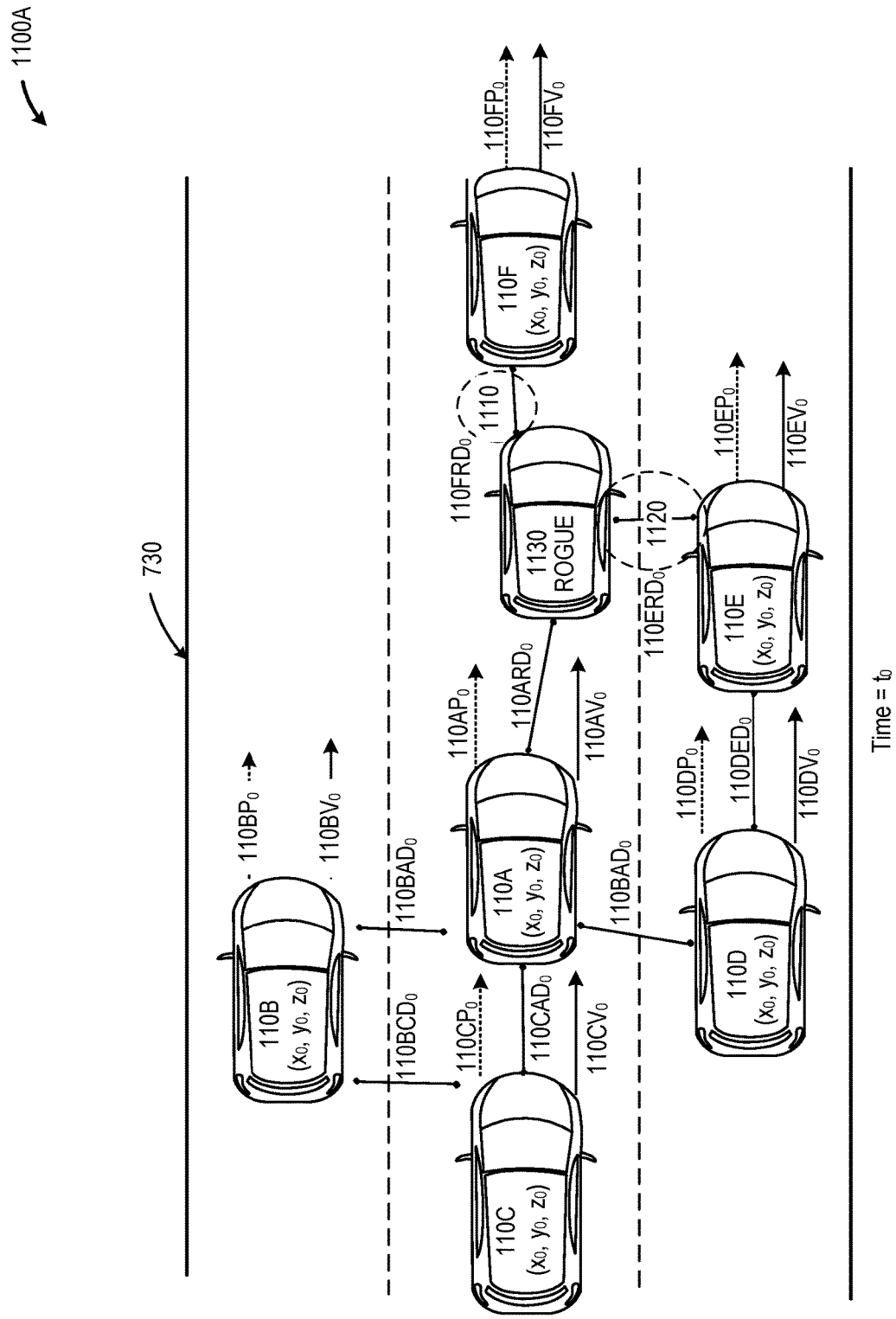
FIG. 11A is a plan view of a system, at time=$t_0$, that includes an illustrative plurality of vehicles bidirectionally coupled to each other via a VANET and a vehicle under manual control, in accordance with at least one embodiment described herein.

FIG. 11A is a plan view of a system 1100A, at time=$t_0$, that includes an illustrative plurality of vehicles 110A-110F bidirectionally coupled to each other via a VANET 120 and a vehicle 1130 under manual control, in accordance with at least one embodiment described herein. As depicted in FIG. 11A, each of the VANET vehicles 110A-110F has associated therewith a defined location ($x_0$, $y_0$, $z_0$) at time=$t_0$. Each of the VANET vehicles also has associated therewith a velocity ($V_0$) and a preferred future travel path ($P_0$). The sensors 164 on each of the VANET vehicles 110A-110F detect the distance ($d_0$) between the respective vehicle and nearby vehicles. As depicted in FIG. 11A, the distance 1110 between the manually controlled vehicle 1130 and VANET vehicle 110F (110F-$Rd_0$) is less than a defined minimum safe distance based on the safe vehicle operating behaviors 145F determined by the inner safety belief circuitry 146F in VANET vehicle. Based on the distance 1110, the rogue vehicle detection and avoidance circuitry 142F associated with VANET vehicle 110F identifies the manually controlled vehicle 1130 as a "rogue vehicle." Also as depicted in FIG. 11A, 110E depicted in FIG. 11A, the distance 1120 between the manually controlled vehicle 1130 and VANET vehicle 110E (110E-$Rd_0$) is less than a defined minimum safe distance as determined by the safe vehicle operating behaviors 145E as determined by the inner safety belief circuitry 146E in VANET vehicle 110E. Based on the distance 1120, the rogue vehicle detection and avoidance circuitry 142E associated with VANET vehicle 110E also identifies the manually controlled vehicle 1130 as a "rogue vehicle."

Figure 11B:
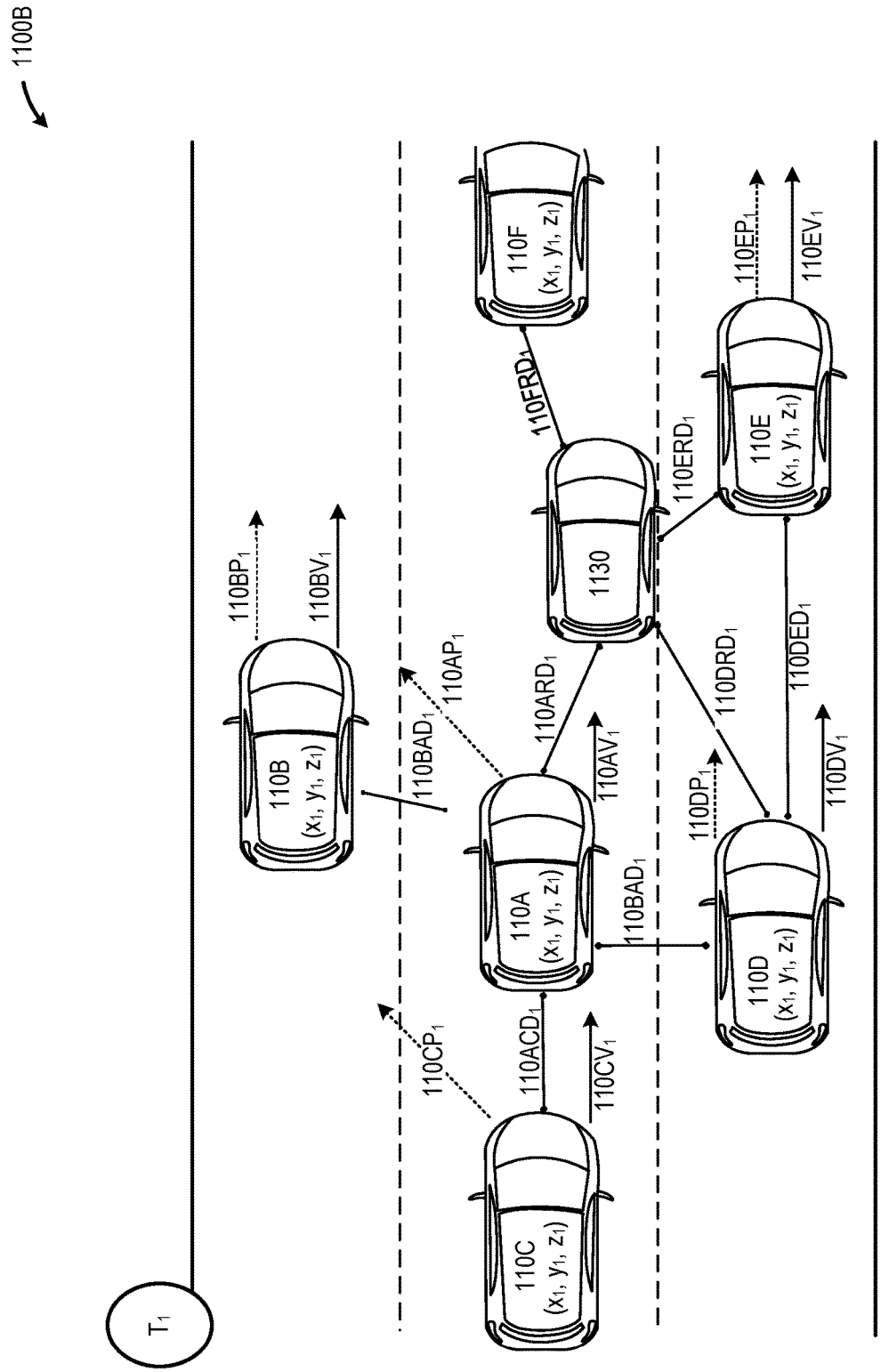
FIG. 11B is a plan view of a system, at time=$t_1$, in which the illustrative plurality of vehicles determine preferred future travel paths based upon the presence of a nearby vehicle that has been identified as a rogue vehicle by one or more VANET vehicles, in accordance with at least one embodiment described herein.

FIG. 11B is a plan view of a system 1100B, at time=$t_1$, in which the illustrative plurality of vehicles 110A-110F determine preferred future travel paths based upon the presence of a nearby vehicle 1130 that has been identified as a rogue vehicle by one or more VANET vehicles 110, in accordance with at least one embodiment described herein. As depicted in FIG. 11B, the trajectory generation circuitry 146 in VANET vehicles 110E and 110F determines a preferred future path that increases the velocity 110EV$_1$ and 110FV$_1$ for VANET vehicles 110E and 110F, respectively, in order to increase the distance between the identified rogue vehicle 1130 and VANET vehicles 110E and 110F. The trajectory generation circuitry 146B in VANET vehicle 110B determines a preferred future travel path that maintains VANET vehicle 110B in the left-most lane, but increases the velocity 110BV$_1$ of VANET vehicle 110B to pass rogue vehicle 1130. The trajectory generation circuitry 146A and 146C in VANET vehicles 110A and 110C, respectively, determines a preferred future travel paths 110AP$_1$ and 110CP$_1$, each of which cause both the respective VANET vehicle 110A, 110C to change from the middle lane to the left-most lane and decrease the velocity 110AV$_1$ and 110CV$_1$ to maintain a safe separation distance 110ARd$_1$ and 110CRd$_1$ from the rogue vehicle 1130. The trajectory generation circuitry 146D in VANET vehicle 110D determines a preferred future travel path 110DP$_1$ that maintains VANET vehicle 110D in the right-most lane, while maintaining a safe distance 110DRd$_1$ between VANET vehicle 110D and rogue vehicle 1130.

Figure 11C:
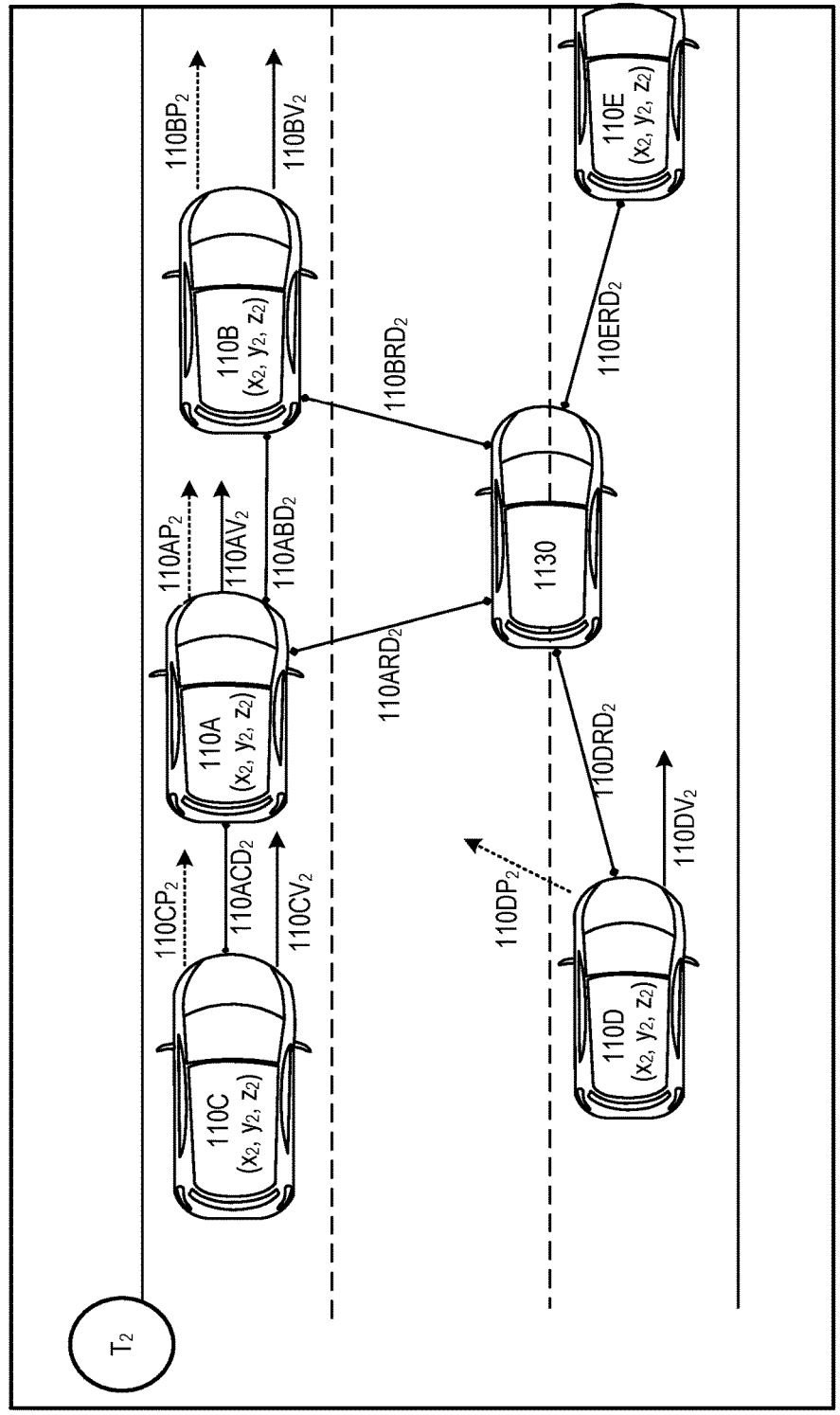
FIG. 11C is a plan view of a system, at time=$t_2$, in which the illustrative plurality of vehicles determine preferred future travel paths based upon the presence of a nearby vehicle 110 that has been identified as a rogue vehicle by one or more VANET vehicles, in accordance with at least one embodiment described herein.
Figure 11D:
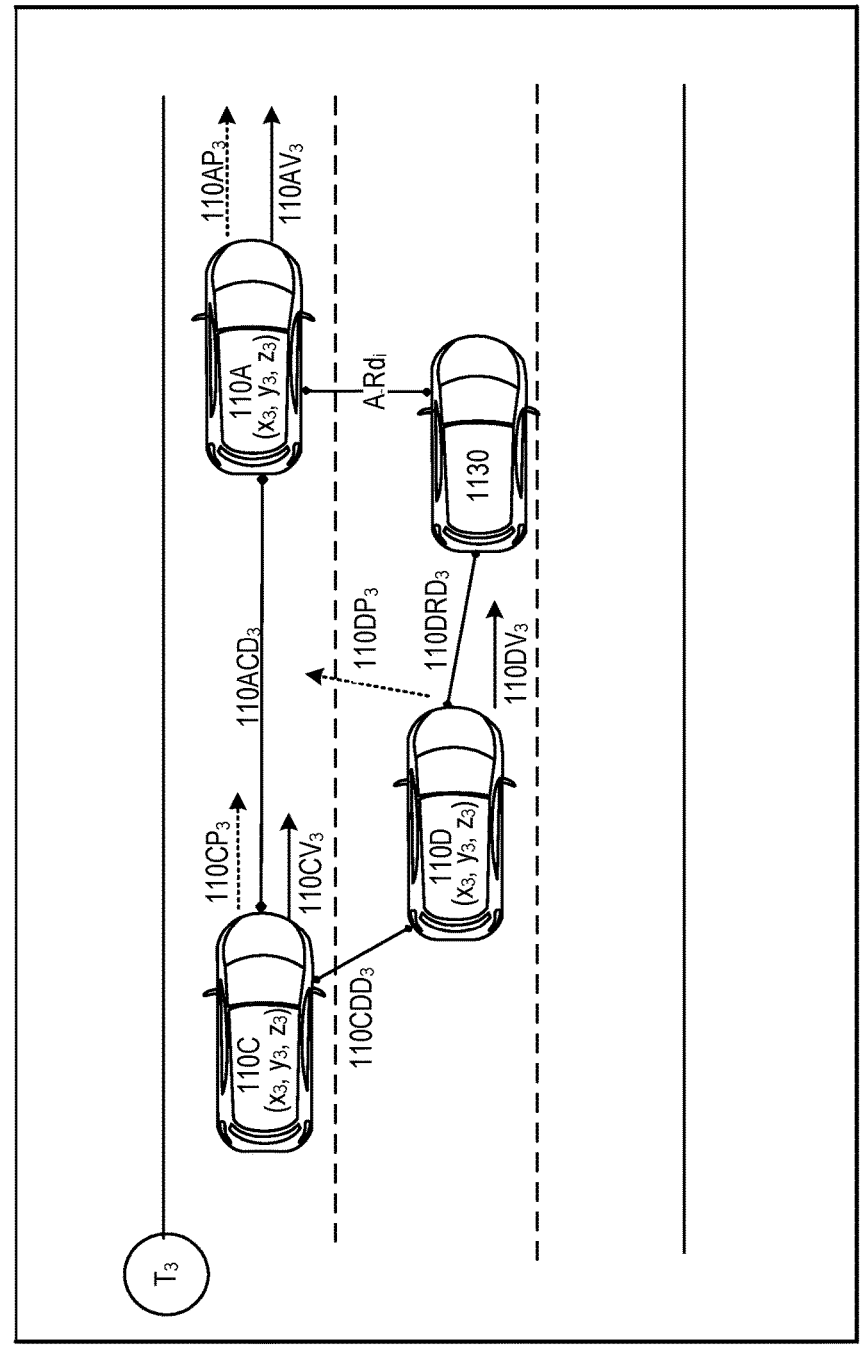
FIG. 11D is a plan view of the system, at time=$t_3$, in which the illustrative plurality of vehicles determine preferred future travel paths based upon the presence of a nearby vehicle that has been identified as a rogue vehicle by one or more VANET vehicles, in accordance with at least one embodiment described herein.

FIG. 11C is a plan view of a system 1100C, at time=$t_2$, in which the illustrative plurality of vehicles 110A-110E determine preferred future travel paths based upon the presence of a nearby vehicle 1130 that has been identified as a rogue vehicle by one or more VANET vehicles 110, in accordance with at least one embodiment described herein. As depicted in FIG. 11C, the trajectory generation circuitry 146B in VANET vehicle 110B determines a preferred future travel path 110BP$_2$ that maintains VANET vehicle 110B in the left-most lane and maintains a velocity 110BV$_2$ that continues to increase the distance 110BRd$_2$ between VANET vehicle 110B and rogue vehicle 1130. The trajectory generation circuitry 146A and 146C in VANET vehicles 110A and 110C, respectively, determines a preferred future travel paths 110Ap$_2$ and 110Cp$_2$, each of which cause the respective VANET vehicle 110A, 110C to maintain position in the left-most lane and cause the velocities 110Av$_2$ and 110Cv$_2$ of both VANET vehicles 110A and 110C to continue to increase the separation distance from the rogue vehicle 1130. The trajectory generation circuitry 146D in VANET vehicle 110D determines a preferred future travel path 110DP$_2$ that causes VANET vehicle 110D to shift from the right-most lane to the center lane, while maintaining a safe distance 110DRd$_2$ between VANET vehicle 110D and rogue vehicle 1130. FIG. 11D is a plan view of the system 1100, at time=t$_3$, in which the illustrative plurality of vehicles, 110A, 110C, and 110D, determine preferred future travel paths 110Ap$_3$, 110Cp$_3$, and 110Dp$_3$, based upon the presence of a nearby vehicle 1130 that has been identified as a rogue vehicle by one or more VANET vehicles 110, in accordance with at least one embodiment described herein. The trajectory generation circuitry 146A and 146C in VANET vehicles 110A and 110C, respectively, determines a preferred future travel paths 110Ap$_3$ and 110Cp$_3$, each of which cause the respective VANET vehicle 110A, 110C to maintain position in the left-most lane and cause the velocities 110Av$_3$ and 110Cv$_3$ of both VANET vehicles 110A and 110C to continue to increase the separation distance from the rogue vehicle 1130. The trajectory generation circuitry 146D in VANET vehicle 110D determines a preferred future travel path 110Dp$_3$ that causes VANET vehicle 110D to shift from the center lane to the left-most lane, while maintaining a safe distance 110DRd$_3$ between VANET vehicle 110D and rogue vehicle 1130.

Figure 11E:
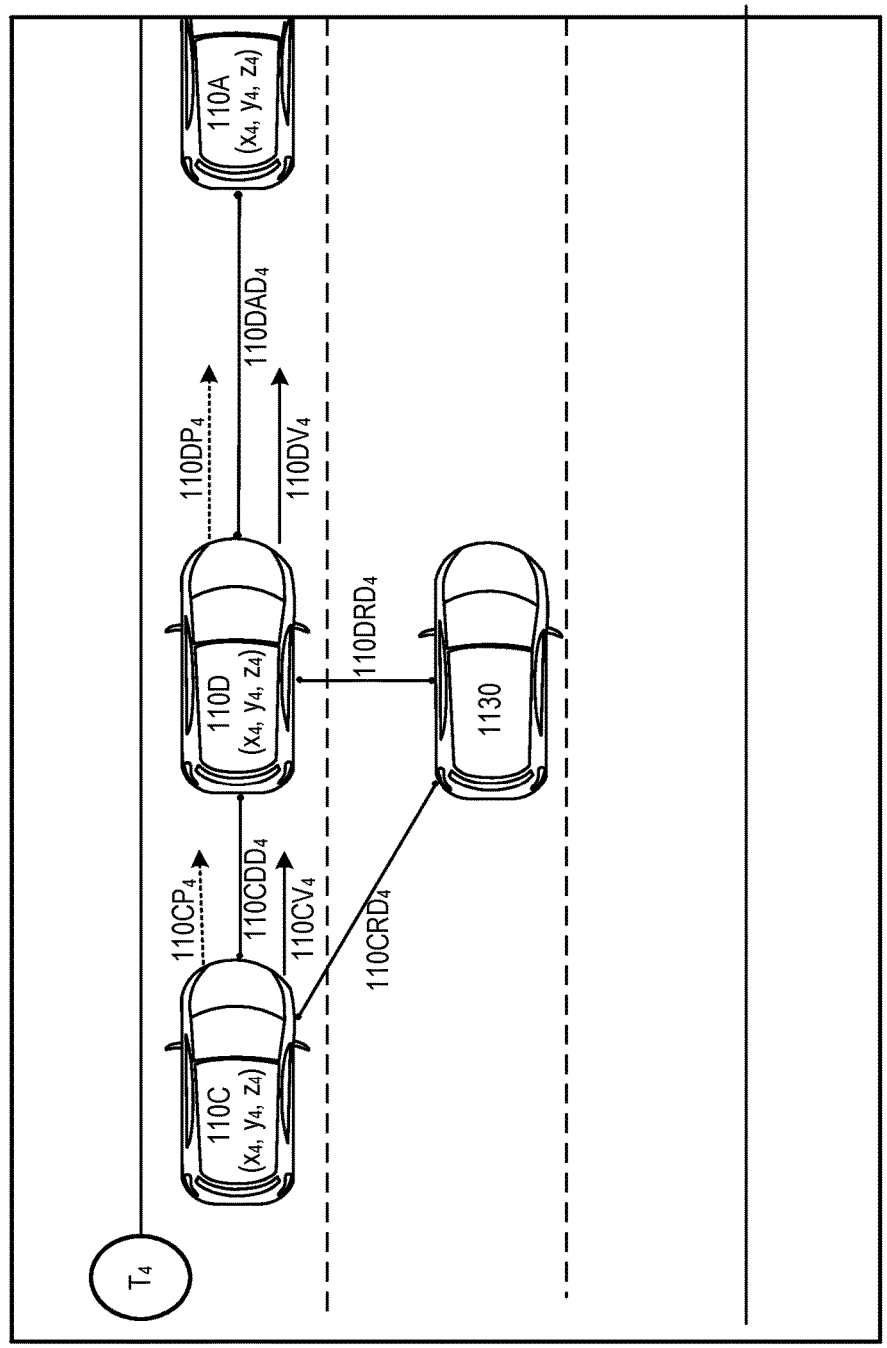
FIG. 11E is a plan view of the system, at time=$t_4$, in which the illustrative plurality of vehicles determine preferred future travel paths based upon the presence of a nearby vehicle that has been identified as a rogue vehicle by one or more VANET vehicles, in accordance with at least one embodiment described herein.

FIG. 11E is a plan view of the system 1100, at time=t$_4$, in which the illustrative plurality of vehicles, 110A, 110C, and 110D, determine preferred future travel paths 110Ap$_4$, 110Cp$_4$, and 110Dp$_4$, based upon the presence of a nearby vehicle 1130 that has been identified as a rogue vehicle by one or more VANET vehicles 110, in accordance with at least one embodiment described herein. The trajectory generation circuitry 146A and 146C in VANET vehicles 110A and 110C, respectively, determines a preferred future travel paths 110Ap$_4$ and 110Cp$_4$, each of which cause the respective VANET vehicle 110A, 110C to maintain position in the left-most lane and cause the velocities 110Av$_4$ and 110Cv$_4$ of both VANET vehicles 110A and 110C to continue to increase the separation distance from the rogue vehicle 1130. The trajectory generation circuitry 146D in VANET vehicle 110D determines a preferred future travel path 110Dp$_4$ that causes VANET vehicle 110D to maintain a position in the left-most lane, while maintaining a safe distance 110DRd$_4$ between VANET vehicle 110D rogue vehicle 1130 and a safe distance 110DAd$_4$ between VANET vehicles 110A and 110D.

Figure 12:
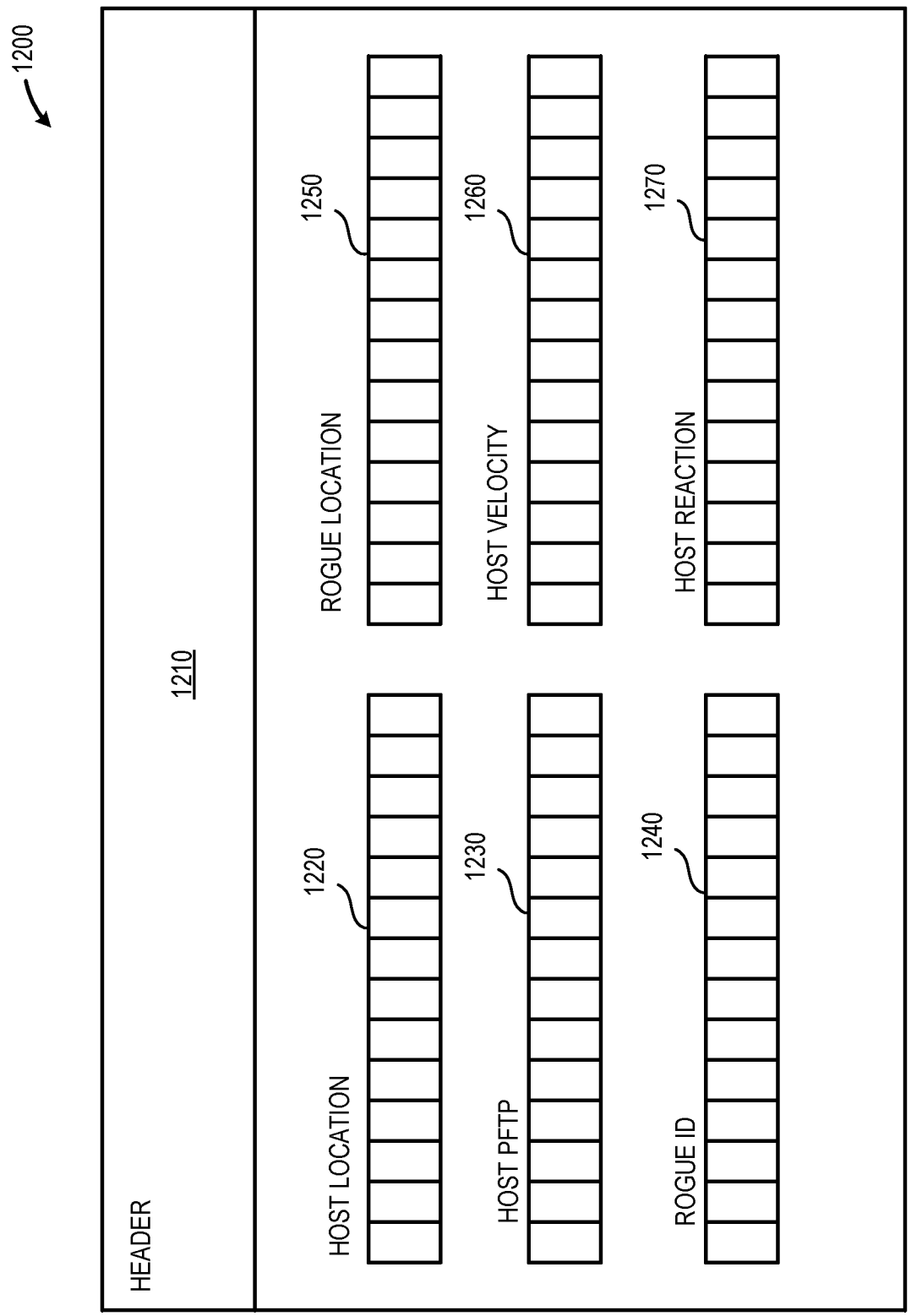
FIG. 12 is an example data packet generated by the rogue vehicle detection systems disposed each of a plurality of VANET vehicles and communicated to at least a portion of the plurality of VANET vehicles, in accordance with at least one embodiment described herein.

FIG. 12 is an example data packet 1200 generated by the rogue vehicle detection systems 130 disposed each of a plurality of VANET vehicles 110 and communicated to at least a portion of the plurality of VANET vehicles 110, in accordance with at least one embodiment described herein. In embodiments, the rogue vehicle detection system 130 in each VANET vehicle may generate and communicate (e.g., via multicast) a packet to some or all of the other VANET vehicles 110A-110n. Such packets may be generated and communicated on a periodic, aperiodic, continuous, or intermittent basis. In embodiments, such packets may be generated and communicated on an event-driven basis. For example, a VANET vehicle 110A may generate and communicate a packet upon an event such as a nearby vehicle violating one of the safe vehicle operating behaviors 145 determined by the inner safety belief circuitry 144 of VANET vehicle 110A.

The packet 1200 includes a header portion 1210 that may contain information such as a date, time, host vehicle identifier, host vehicle VANET address, and similar. The packet payload may contain any number of fields that each contain information and/or data associated with one or more host vehicle parameters or behaviors and information and/or data associated with one or more rogue vehicles. For example, as depicted in FIG. 12, the payload portion of the packet may include a plurality of data fields to contain information and/or data associated with either or both the host vehicle and one or more identified rogue vehicles.

In embodiments, the payload portion of the packet 1200 includes a first data field 1220 that includes data representative of the host vehicle location. The first data field 1220 may have any size needed to carry information and/or data associated with the location of the host vehicle 710. In embodiments, the first data field 1220 may include information and/or data that identifies the location of the host vehicle 710 with respect to one or more other VANET vehicles 110. In embodiments, the first data field 1220 may include information and/or data that identifies the geolocation of the host vehicle 710, for example using global positioning system coordinates and/or longitude/latitude. The first data field 1220 may have a size of from 2 bytes to about 128 bytes.

In embodiments, the payload portion of the packet 1200 includes a second data field 1230 that includes data representative of the host vehicle preferred future travel path. The second data field 1230 may have any size needed to carry information and/or data associated with the preferred future travel path of the host vehicle 710. In embodiments, the second data field 1230 may include a velocity vector (e.g., magnitude/speed and direction of travel) of the preferred future travel path. The second data field 1230 may have a size of from about 2 bytes to about 128 bytes.

In embodiments, the payload portion of the packet 1200 includes a third data field 1230 that includes data representative of a rogue vehicle identifier assigned by the host vehicle 710. The third data field 1230 may have any size needed to carry information and/or data associated with an identifier assigned to a rogue vehicle 810. In embodiments, the third data field 1230 may have a size of from about 2 bytes to about 64 bytes.

In embodiments, the payload portion of the packet 1200 includes a fourth data field 1250 that includes data representative of a location associated with an identified rogue vehicle. The fourth data field 1250 may have any size needed to carry information and/or data associated with the location of the identified rogue vehicle 810. In embodiments, the fourth data field 1250 may include information and/or data that identifies the location of the rogue vehicle 810 with respect to one or more other VANET vehicles 110. In embodiments, the fourth data field 1250 may include information and/or data that identifies the location of the rogue vehicle 810 with respect to the host vehicle 710. The fourth data field 1220 may have a size of from 2 bytes to about 128 bytes.

In embodiments, the payload portion of the packet 1200 may include a fifth data field 1260 that includes data representative of the host vehicle velocity. The fifth data field 1260 may have any size needed to carry information and/or data associated with the velocity of the host vehicle 710. The fifth data field 1260 may have a size of from about 2 bytes to about 64 bytes.

In embodiments, the payload portion of the packet 1200 may include a sixth data field 1270 that includes data representative of the reaction time between the host vehicle 710 and another nearby vehicle. The sixth data field 1270 may have any size needed to carry information and/or data associated with the reaction time of the host vehicle 710. The sixth data field 1270 may have a size of from about 2 bytes to about 64 bytes.

Figure 13:
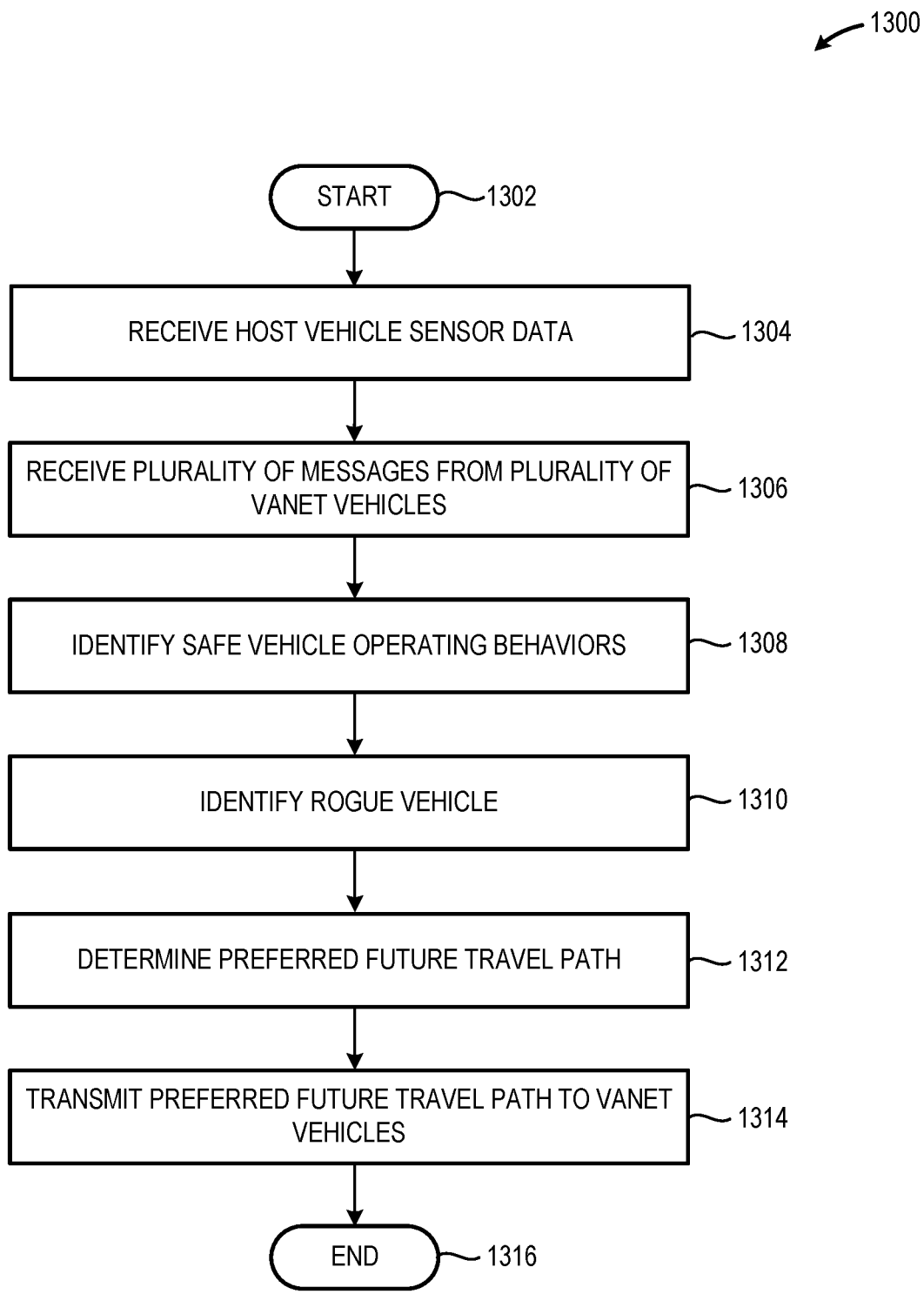
FIG. 13 is a high-level flow diagram of an illustrative rogue vehicle detection and avoidance method, in accordance with at least one embodiment described herein.

FIG. 13 is a high-level flow diagram of an illustrative rogue vehicle detection and avoidance method 1300, in accordance with at least one embodiment described herein. A plurality of vehicles may form a vehicular ad-hoc network (VANET) that permits the exchange of information and/or data between VANET vehicles 110. Each of the VANET vehicles 110 includes a sensor array 162 used to collect information and/or data associated with the host vehicle 710 carrying the sensor array and other nearby vehicles external to the host vehicle 710. Using the sensor information along with the information exchanged with other VANET vehicles, the host vehicle is able to determine a set of safe vehicle operating behaviors 145. Using the safe vehicle operating behaviors 145 each VANET vehicle monitors the operation and/or behavior of other vehicles to identify rogue vehicles 810 that perform illegal acts, unsafe actions, and/or actions that contravene the safe vehicle operating behaviors 145 established by the host vehicle. Further, each VANET vehicle determines a preferred future travel path, for example to pass a slower vehicle or to avoid a roadway hazard that is communicated to the other VANET vehicles. Using the information associated with an identified rogue vehicle 810 and the preferred future travel path for each VANET vehicle, the host vehicle 710 determines a preferred future travel path that increases the safety margin about the identified rogue vehicle and avoids collisions with any of the other VANET vehicles. The method 1300 commences at 1320.

At 1304, the host vehicle 710 receives information and/or data from the sensor array 162. The information and/or data may include visible spectrum image data, infrared image data, radar data, LIDAR data, ultrasonic sensor data, location/geolocation data, velocity data, linear and/or lateral acceleration data, brake position data, accelerator position data, and similar. In embodiments, the received data may be analyzed using one or more processors disposed in the host vehicle 710 to identify objects such as landmarks, roadway markings, roadway signs, other nearby vehicles, flashing lights/emergency vehicles and similar. The received sensor data may permit the host vehicle 710 to determine a location relative to one or more nearby vehicles.

At 1306, the host vehicle 710 receives a plurality of signals, each of the signals generated by a respective one of the plurality of VANET vehicles 110. In embodiments, each of the plurality of signals includes information and/or data representative of the location and preferred future travel path of the originating VANET vehicle. In embodiments, some or all of the plurality of signals may include information and/or data associated with one or more rogue vehicles identified by the originating VANET vehicle.

At 1308, the host vehicle 710, using information obtained by the sensor array 162 and information obtained from other VANET vehicles 110, determines one or more safe vehicle operating behaviors 145. Beneficially, since the host vehicle 710 is using information obtained and received in near real-time, the safe vehicle operating behaviors 145 determined by the host vehicle 710 reflect real work situations and circumstances. For example, a sudden downpour may reduce speeds and increase stopping distances. In the absence of sensor data and/or information from other VANET vehicles, the host vehicle 710 may either not be aware of the impact the local environmental conditions have on save vehicle operating behaviors or may experience a delay until information regarding the weather is obtained from a third party source. Example safe vehicle operating behaviors 145 may include but are not limited to: following distance based on environmental conditions and speed; speed based on environmental conditions and proximity to other vehicles; acceleration based on road and environmental conditions; directional control based on identified rogue vehicles and other proximate vehicles; or combinations thereof.

At 1310, using the received sensor data, the rogue vehicle detection circuitry 142 in the host vehicle 710 identifies one or more nearby vehicles operating in a manner that contravenes the safe vehicle operating behaviors 145 generated at 1308 as a rogue vehicle 810. In embodiments, the host vehicle 710 may receive information associated with a rogue vehicle from one or more other VANET vehicles 110.

At 1312, using any determined rogue vehicle information, any received rogue vehicle information, and/or any received preferred future travel path information associated with other VANET vehicles 110, the trajectory generation circuitry 146 in the host vehicle 710 generates a preferred future travel path that maintains a safe distance between the host vehicle 710 and any identified rogue vehicles 810 as well as avoids future collisions with other VANET vehicles based upon the received information representative of the preferred future travel paths of the other VANET vehicles 110.

At 1314, the host vehicle 710 transmits a packet that includes information indicative of the location of the host vehicle 710 and the preferred future travel path of the host vehicle 710 to the other VANET vehicles 110. The method concludes at 1316.

While FIG. 13 illustrates various operations according to one or more embodiments, it is to be understood that not all of the operations depicted in FIG. 13 are necessary for other embodiments. Indeed, it is fully contemplated herein that in other embodiments of the present disclosure, the operations depicted in FIG. 13, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods for detecting rogue vehicles within a plurality of vehicles connected via a vehicular ad-hoc network (VANET). Sensors on each VANET vehicle provide data associated with the host vehicle and other nearby vehicles that may be under autonomous, semi-autonomous, or manual control. Each VANET vehicle broadcasts information that includes location, velocity, and preferred future travel path to the other VANET vehicles. Using data from the host vehicle sensors and data received from other VANET vehicles the host vehicle generates a dynamic set of safe vehicle operating behaviors. Nearby vehicles that do not comply with the determined safe vehicle operating behaviors or perform illegal/unsafe acts are identified as rogue vehicles. Data associated with identified rogue vehicles is transmitted to all VANET vehicles. Each VANET vehicle determines a preferred future travel path based on the received information associated with rogue vehicles, the preferred future travel path information received from other VANET vehicles, and the host vehicle's safe vehicle operating behaviors.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for bidirectional communication and collaboration to identify and avoid rogue vehicles and coordinate future movement and/or positioning between vehicles using a vehicular ad-hoc network (VANET).

According to example 1, there is provided a rogue vehicle detection method. The method may include: receiving, at rogue vehicle detection circuitry in a host vehicle, one or more signals that include information indicative of one or more behaviors of the host vehicle; receiving, at transceiver circuitry in the host vehicle, a plurality of messages, each of the plurality of messages associated with a respective one of a plurality of vehicular ad-hoc network connected vehicles (VANET vehicles), wherein each of the plurality of messages includes: information indicative of a current location and a future preferred path of the respective VANET vehicle; identifying, by inner safety belief circuitry, one or more safe vehicle operating behaviors; identifying, by the rogue vehicle detection circuitry, a rogue vehicle based on the one or more identified safe vehicle operating behaviors; determining, by the trajectory generation circuitry, a preferred future travel path for the host vehicle based on: the preferred future travel path of respective ones of the VANET vehicles; the identified rogue vehicle; and the one or more safe vehicle operating behaviors; and transmitting, via the transceiver circuitry, data representative of the determined preferred future travel path of the host vehicle to each of the VANET vehicles.

Example 2 may include elements of example 1 where identifying a rogue vehicle based on the one or more safe vehicle operating behaviors may include: detecting, via one or more sensors disposed in the host vehicle, information indicative of one or more behaviors associated with the rogue vehicle; and comparing, by the rogue vehicle detection circuitry, the information indicative of the detected one or more behaviors associated with the rogue vehicle with the one or more identified safe vehicle operating behaviors.

Example 3 may include elements of any of examples 1 or 2 where identifying a rogue vehicle based on the one or more safe vehicle operating behaviors may include: receiving, via the transceiver circuitry, from one or more VANET vehicles, information indicative of one or more behaviors associated with the rogue vehicle; and comparing, by the rogue vehicle detection circuitry, the information indicative of the received one or more behaviors associated with the rogue vehicle with the one or more identified safe vehicle operating behaviors.

Example 4 may include elements of any of examples 1 through 3 where receiving a plurality of messages, each of the plurality of messages associated with a respective one of a plurality of vehicular ad-hoc network connected vehicles (VANET vehicles) may include: receiving a plurality of messages, each of the plurality of messages associated with a respective one of a plurality of vehicular ad-hoc network connected vehicles (VANET vehicles), wherein each of the plurality of messages further includes: information indicative of one or more behaviors of the respective VANET vehicle.

Example 5 may include elements of any of examples 1 through 4 where identifying one or more safe vehicle operating behaviors may include: identifying, by the inner safety belief circuitry, one or more safe vehicle operating behaviors using: the received information indicative of one or more behaviors of respective ones of the VANET vehicles; and the information indicative of one or more behaviors of the host vehicle.

Example 6 may include elements of any of examples 1 through 5 where determining a preferred future travel path for the host vehicle may include: determining a preferred future travel path for the host vehicle using: the preferred future travel path of one or more VANET vehicles; the identified rogue vehicle; the one or more safe vehicle operating behaviors; and one or more behavior modes selected by a host vehicle operator.

Example 7 may include elements of any of examples 1 through 6 where identifying a rogue vehicle based on the one or more identified safe vehicle operating behaviors may include: identifying, by the rogue vehicle detection circuitry, a rogue vehicle based on: the one or more identified safe vehicle operating behaviors; and one or more vehicle occupant actions indicative of a rogue vehicle.

Example 8 may include elements of any of examples 1 through 7 where receiving a plurality of messages each of the plurality of messages including information indicative of a current location of a respective VANET vehicle may include: receiving, at the transceiver circuitry in the host vehicle, a plurality of messages, each of the plurality of messages including information indicative of a geolocation of the respective VANET vehicle.

Example 9 may include elements of any of examples 1 through 8 where receiving a plurality of messages each of the plurality of messages including information indicative of a current location of a respective VANET vehicle may include: receiving, at the transceiver circuitry in the host vehicle, a plurality of messages, each of the plurality of messages including information indicative of a location of the respective VANET vehicle with respect to at least one other VANET vehicle.

Example 10 may include elements of any of examples 1 through 9 where receiving a plurality of messages, each of the plurality of messages associated with a respective one of a plurality of VANET vehicles may include: receiving a plurality of messages, each of the plurality of messages associated with a respective one of a plurality of VANET vehicles and including: information indicative of a current location and a future preferred path of the respective VANET vehicle; and information indicative one or more environmental conditions external to the respective VANET vehicle.

Example 11 may include elements of any of examples 1 through 10 and the method may additionally include: generating an output signal that includes display data indicative of the preferred future travel path for the host vehicle.

Example 12 may include elements of any of examples 1 through 11 and the method may additionally include: generating an output signal that includes display data indicative of the location and preferred future travel path of at least a portion of the plurality of VANET vehicles.

Example 13 may include elements of any of examples 1 through 12 and the method may additionally include: generating one or more output signals that cause the host vehicle to autonomously follow the determined preferred future travel path.

According to example 14, there is provided a rogue vehicle detection system. The system may include: input interface circuitry; transceiver circuitry; output interface circuitry; rogue vehicle detection circuitry coupled to the input interface circuitry, the transceiver circuitry, and the output interface circuitry; and a storage device that includes machine-readable instructions that, when executed by the rogue vehicle detection circuitry, cause the rogue vehicle detection circuitry to: receive, via the transceiver circuitry, one or more signals that include information indicative of one or more behaviors of a host vehicle; receive, via the transceiver circuitry, a plurality of messages, each associated with a respective one of a plurality of vehicular ad-hoc network connected vehicles (VANET vehicles), wherein each of the plurality of messages includes: information indicative of a current location and a future preferred path of the respective VANET vehicle; identify one or more safe vehicle operating behaviors; identify a rogue vehicle using the one or more identified safe vehicle operating behaviors; determine a preferred future travel path for the host vehicle based, at least in part, on: the future preferred path of respective ones of the VANET vehicles; the identified rogue vehicle; and the one or more safe vehicle operating behaviors; and cause a transmission, via the transceiver circuitry, of data representative of the determined future preferred path of the host vehicle to each of the VANET vehicles.

Example 15 may include elements of example 14 where the machine-readable instructions that cause the rogue vehicle detection circuitry to identify a rogue vehicle using the one or more identified safe vehicle operating behaviors may cause the rogue vehicle detection circuitry to: receive, from one or more sensors disposed in the host vehicle, one or more signals that include information indicative of one or more behaviors associated with the rogue vehicle; and compare the information indicative of the detected one or more behaviors associated with the rogue vehicle with the one or more identified safe vehicle operating behaviors.

Example 16 may include elements of any of examples 14 or 15 where the machine-readable instructions that cause the rogue vehicle detection circuitry to identify a rogue vehicle using the one or more identified safe vehicle operating behaviors may cause the rogue vehicle detection circuitry to: receive from one or more VANET vehicles, information indicative of one or more behaviors associated with the rogue vehicle; and compare the information indicative of the received one or more behaviors associated with the rogue vehicle with the one or more identified safe vehicle operating behaviors.

Example 17 may include elements of any of examples 14 through 16 where the machine-readable instructions that cause the rogue vehicle detection circuitry to receive a plurality of messages, each associated with a respective one of a plurality of vehicular ad-hoc network connected vehicles (VANET vehicles) may cause the rogue vehicle detection and avoidance circuitry to: receive a plurality of messages, each of the plurality of messages associated with a respective one of a plurality of vehicular ad-hoc network connected vehicles (VANET vehicles), wherein each of the plurality of messages further includes: information indicative of one or more behaviors of the respective VANET vehicle.

Example 18 may include elements of any of examples 14 through 17 where the machine-readable instructions that cause the rogue vehicle detection circuitry to identifying one or more safe vehicle operating behaviors may cause the rogue vehicle detection circuitry to: identify one or more safe vehicle operating behaviors using: the received information indicative of one or more behaviors of respective ones of the VANET vehicles; and the information indicative of one or more behaviors of the host vehicle.

Example 19 may include elements of any of examples 14 through 18 where the machine-readable instructions that cause the rogue vehicle detection circuitry to determine a preferred future travel path for the host vehicle may cause the rogue vehicle detection circuitry to: determine a preferred future travel path for the host vehicle using: the preferred future travel path of one or more VANET vehicles; the identified rogue vehicle; the one or more safe vehicle operating behaviors; and one or more behavior modes selected by a host vehicle operator.

Example 20 may include elements of any of examples 14 through 19 where the machine-readable instructions that cause the rogue vehicle detection circuitry to identify a rogue vehicle based on the one or more identified safe vehicle operating behaviors may cause the rogue vehicle detection circuitry to: identify a rogue vehicle based on: the one or more identified safe vehicle operating behaviors; and one or more vehicle occupant actions indicative of a rogue vehicle.

Example 21 may include elements of any of examples 14 through 20 where the machine-readable instructions that cause the rogue vehicle detection circuitry to receive a plurality of messages each of the plurality of messages including information indicative of a current location of a respective VANET vehicle may cause the rogue vehicle detection circuitry to: receive a plurality of messages, each of the plurality of messages including information indicative of a geolocation of the respective VANET vehicle.

Example 22 may include elements of any of examples 14 through 21 where the machine-readable instructions that cause the rogue vehicle detection circuitry to receive a plurality of messages each of the plurality of messages including information indicative of a current location of a respective VANET vehicle may cause the rogue vehicle detection circuitry to: receive a plurality of messages, each of the plurality of messages including information indicative of a location of the respective VANET vehicle with respect to at least one other VANET vehicle.

Example 23 may include elements of any of examples 14 through 22 where the machine-readable instructions that cause the rogue vehicle detection circuitry to receive a plurality of messages each of the plurality of messages including information indicative of a current location of a respective VANET vehicle may cause the rogue vehicle detection circuitry to: receive a plurality of messages, each of the plurality of messages associated with a respective one of a plurality of VANET vehicles and including: information indicative of a current location and a future preferred path of the respective VANET vehicle; and information indicative one or more environmental conditions external to the respective VANET vehicle.

Example 24 may include elements of any of examples 14 through 23 where the machine-readable instructions may cause the rogue vehicle detection circuitry to: generate an output signal that includes display data indicative of the preferred future travel path for the host vehicle.

Example 25 may include elements of any of examples 14 through 24 where the machine-readable instructions further cause the rogue vehicle detection circuitry to: generate an output signal that includes display data indicative of the location and preferred future travel path of at least a portion of the plurality of VANET vehicles.

Example 26 may include elements of any of examples 14 through 25 where the machine-readable instructions may cause the rogue vehicle detection circuitry to: generating one or more output signals that cause the host vehicle to autonomously follow the determined preferred future travel path.

According to example 27, there is provided a non-transitory storage device that includes machine-readable instructions that, when executed by rogue vehicle detection circuitry, cause the rogue vehicle detection circuitry to: receive one or more signals that include information indicative of one or more behaviors of a host vehicle; receive a plurality of messages, each associated with a respective one of a plurality of vehicular ad-hoc network connected vehicles (VANET vehicles), wherein each of the plurality of messages includes: information indicative of a current location and a future preferred path of the respective VANET vehicle; identify one or more safe vehicle operating behaviors; identify a rogue vehicle using the one or more identified safe vehicle operating behaviors; determine a preferred future travel path for the host vehicle based, at least in part, on: the future preferred path of respective ones of the VANET vehicles; the identified rogue vehicle; and the one or more safe vehicle operating behaviors; and cause a transmission of data representative of the determined future preferred path of the host vehicle to each of the VANET vehicles.

Example 28 may include elements of example 27 where the machine-readable instructions that cause the rogue vehicle detection circuitry to identify a rogue vehicle using the one or more identified safe vehicle operating behaviors may cause the rogue vehicle detection circuitry to: receive one or more signals that include information indicative of one or more behaviors associated with the rogue vehicle; and compare the information indicative of the detected one or more behaviors associated with the rogue vehicle with the one or more identified safe vehicle operating behaviors.

Example 29 may include elements of any of examples 27 or 28 where the machine-readable instructions that cause the rogue vehicle detection circuitry to identify a rogue vehicle using the one or more identified safe vehicle operating behaviors further cause the rogue vehicle detection circuitry to: may cause the rogue vehicle detection circuitry to: receive from one or more VANET vehicles, information indicative of one or more behaviors associated with the rogue vehicle; and compare the information indicative of the received one or more behaviors associated with the rogue vehicle with the one or more identified safe vehicle operating behaviors.

Example 30 may include elements of any of examples 27 through 29 where the machine-readable instructions that cause the rogue vehicle detection circuitry to receive a plurality of messages, each associated with a respective one of a plurality of vehicular ad-hoc network connected vehicles (VANET vehicles) may cause the rogue vehicle detection and avoidance circuitry to: receive a plurality of messages, each of the plurality of messages associated with a respective one of a plurality of vehicular ad-hoc network connected vehicles (VANET vehicles), wherein each of the plurality of messages further includes: information indicative of one or more behaviors of the respective VANET vehicle.

Example 31 may include elements of any of examples 27 through 30 where the machine-readable instructions that cause the rogue vehicle detection circuitry to identifying one or more safe vehicle operating behaviors may cause the rogue vehicle detection circuitry to: identify one or more safe vehicle operating behaviors using: the received information indicative of one or more behaviors of respective ones of the VANET vehicles; and the information indicative of one or more behaviors of the host vehicle.

Example 32 may include elements of any of examples 27 through 31 where the machine-readable instructions that cause the rogue vehicle detection circuitry to determine a preferred future travel path for the host vehicle may cause the rogue vehicle detection circuitry to: determine a preferred future travel path for the host vehicle using: the preferred future travel path of one or more VANET vehicles; the identified rogue vehicle; the one or more safe vehicle operating behaviors; and one or more behavior modes selected by a host vehicle operator.

Example 33 may include elements of any of examples 27 through 32 where the machine-readable instructions that cause the rogue vehicle detection circuitry to identify a rogue vehicle based on the one or more identified safe vehicle operating behaviors may cause the rogue vehicle detection circuitry to: identify a rogue vehicle based on: the one or more identified safe vehicle operating behaviors; and one or more vehicle occupant actions indicative of a rogue vehicle.

Example 34 may include elements of any of examples 27 through 33 where the machine-readable instructions that cause the rogue vehicle detection circuitry to receive a plurality of messages each of the plurality of messages including information indicative of a current location of a respective VANET vehicle may cause the rogue vehicle detection circuitry to: receive a plurality of messages, each of the plurality of messages including information indicative of a geolocation of the respective VANET vehicle.

Example 35 may include elements of any of examples 27 through 34 where the machine-readable instructions that cause the rogue vehicle detection circuitry to receive a plurality of messages each of the plurality of messages including information indicative of a current location of a respective VANET vehicle may cause the rogue vehicle detection circuitry to: receive a plurality of messages, each of the plurality of messages including information indicative of a location of the respective VANET vehicle with respect to at least one other VANET vehicle.

Example 36 may include elements of any of examples 27 through 35 where the machine-readable instructions that cause the rogue vehicle detection circuitry to receive a plurality of messages each of the plurality of messages including information indicative of a current location of a respective VANET vehicle may cause the rogue vehicle detection circuitry to: receive a plurality of messages, each of the plurality of messages associated with a respective one of a plurality of VANET vehicles and including: information indicative of a current location and a future preferred path of the respective VANET vehicle; and information indicative one or more environmental conditions external to the respective VANET vehicle.

Example 37 may include elements of any of examples 27 through 36 where the machine-readable instructions may cause the rogue vehicle detection circuitry to: generate an output signal that includes display data indicative of the preferred future travel path for the host vehicle.

Example 38 may include elements of any of examples 27 through 37 where the machine-readable instructions may cause the rogue vehicle detection circuitry to: generate an output signal that includes display data indicative of the location and preferred future travel path of at least a portion of the plurality of VANET vehicles.

Example 39 may include elements of any of examples 27 through 38 where the machine-readable instructions may cause the rogue vehicle detection circuitry to: generate one or more output signals that cause the host vehicle to autonomously follow the determined preferred future travel path.

According to example 40, there is provided a host vehicle. The host vehicle may include: one or more sensors; at least one output device; rogue vehicle detection and avoidance system, comprising: input interface circuitry coupled to the one or more sensors; transceiver circuitry; output interface circuitry; rogue vehicle detection and avoidance circuitry coupled to the input interface circuitry, the transceiver circuitry, and the output interface circuitry; and a storage device that includes machine-readable instructions that, when executed by the rogue vehicle detection circuitry, cause the rogue vehicle detection circuitry to: receive, via the transceiver circuitry, one or more signals that include information indicative of one or more behaviors of a host vehicle; receive, via the transceiver circuitry, a plurality of messages, each associated with a respective one of a plurality of vehicular ad-hoc network connected vehicles (VANET vehicles), wherein each of the plurality of messages includes: information indicative of a current location and a future preferred path of the respective VANET vehicle; identify one or more safe vehicle operating behaviors; identify a rogue vehicle using the one or more identified safe vehicle operating behaviors; determine a preferred future travel path for the host vehicle based, at least in part, on: the future preferred path of respective ones of the VANET vehicles; the identified rogue vehicle; and the one or more safe vehicle operating behaviors; and cause a transmission, via the transceiver circuitry, of data representative of the determined future preferred path of the host vehicle to each of the VANET vehicles.

Example 41 may include elements of example 40 where the machine-readable instructions that cause the rogue vehicle detection circuitry to identify a rogue vehicle using the one or more identified safe vehicle operating behaviors may cause the rogue vehicle detection circuitry to: receive, from one or more sensors disposed in the host vehicle, one or more signals that include information indicative of one or more behaviors associated with the rogue vehicle; and compare the information indicative of the detected one or more behaviors associated with the rogue vehicle with the one or more identified safe vehicle operating behaviors.

Example 42 may include elements of any of examples 40 or 41 where the machine-readable instructions that cause the rogue vehicle detection circuitry to identify a rogue vehicle using the one or more identified safe vehicle operating behaviors further cause the rogue vehicle detection circuitry to: may cause the rogue vehicle detection circuitry to: receive from one or more VANET vehicles, information indicative of one or more behaviors associated with the rogue vehicle; and compare the information indicative of the received one or more behaviors associated with the rogue vehicle with the one or more identified safe vehicle operating behaviors.

Example 43 may include elements of any of examples 40 through 42 where the machine-readable instructions that cause the rogue vehicle detection circuitry to receive a plurality of messages, each associated with a respective one of a plurality of vehicular ad-hoc network connected vehicles (VANET vehicles) may cause the rogue vehicle detection and avoidance circuitry to: receive a plurality of messages, each of the plurality of messages associated with a respective one of a plurality of vehicular ad-hoc network connected vehicles (VANET vehicles), wherein each of the plurality of messages further includes: information indicative of one or more behaviors of the respective VANET vehicle.

Example 44 may include elements of any of examples 40 through 43 where the machine-readable instructions that cause the rogue vehicle detection circuitry to identifying one or more safe vehicle operating behaviors may cause the rogue vehicle detection circuitry to: identify one or more safe vehicle operating behaviors using: the received information indicative of one or more behaviors of respective ones of the VANET vehicles; and the information indicative of one or more behaviors of the host vehicle.

Example 45 may include elements of any of examples 40 through 44 where the machine-readable instructions that cause the rogue vehicle detection circuitry to determine a preferred future travel path for the host vehicle may cause the rogue vehicle detection circuitry to: determine a preferred future travel path for the host vehicle using: the preferred future travel path of one or more VANET vehicles; the identified rogue vehicle; the one or more safe vehicle operating behaviors; and one or more behavior modes selected by a host vehicle operator.

Example 46 may include elements of any of examples 40 through 45 where the machine-readable instructions that cause the rogue vehicle detection circuitry to identify a rogue vehicle based on the one or more identified safe vehicle operating behaviors may cause the rogue vehicle detection circuitry to: identify a rogue vehicle based on: the one or more identified safe vehicle operating behaviors; and one or more vehicle occupant actions indicative of a rogue vehicle.

Example 47 may include elements of any of examples 40 through 46 where the machine-readable instructions that cause the rogue vehicle detection circuitry to receive a plurality of messages each of the plurality of messages including information indicative of a current location of a respective VANET vehicle may cause the rogue vehicle detection circuitry to: receive a plurality of messages, each of the plurality of messages including information indicative of a geolocation of the respective VANET vehicle.

Example 48 may include elements of any of examples 40 through 47 where the machine-readable instructions that cause the rogue vehicle detection circuitry to receive a plurality of messages each of the plurality of messages including information indicative of a current location of a respective VANET vehicle may cause the rogue vehicle detection circuitry to: receive a plurality of messages, each of the plurality of messages including information indicative of a location of the respective VANET vehicle with respect to at least one other VANET vehicle.

Example 49 may include elements of any of examples 40 through 48 where the machine-readable instructions that cause the rogue vehicle detection circuitry to receive a plurality of messages each of the plurality of messages including information indicative of a current location of a respective VANET vehicle may cause the rogue vehicle detection circuitry to: receive a plurality of messages, each of the plurality of messages associated with a respective one of a plurality of VANET vehicles and including: information indicative of a current location and a future preferred path of the respective VANET vehicle; and information indicative one or more environmental conditions external to the respective VANET vehicle.

Example 50 may include elements of any of examples 40 through 49 where the machine-readable instructions may cause the rogue vehicle detection circuitry to: generate an output signal that includes display data indicative of the preferred future travel path for the host vehicle.

Example 51 may include elements of any of examples 40 through 50 where the machine-readable instructions may cause the rogue vehicle detection circuitry to: generate an output signal that includes display data indicative of the location and preferred future travel path of at least a portion of the plurality of VANET vehicles.

Example 52 may include elements of any of examples 40 through 51 where the machine-readable instructions may cause the rogue vehicle detection circuitry to: generating one or more output signals that cause the host vehicle to autonomously follow the determined preferred future travel path.

According to example 53, there is provided a rogue vehicle detection system. The system may include: means for receiving one or more signals that include information indicative of one or more behaviors of the host vehicle; means for receiving a plurality of messages, each of the plurality of messages associated with a respective one of a plurality of vehicular ad-hoc network connected vehicles (VANET vehicles), wherein each of the plurality of messages includes: information indicative of a current location and a future preferred path of the respective VANET vehicle; means for identifying one or more safe vehicle operating behaviors; means for identifying a rogue vehicle based on the one or more identified safe vehicle operating behaviors; means for determining a preferred future travel path for the host vehicle based on: the preferred future travel path of respective ones of the VANET vehicles; the identified rogue vehicle; and the one or more safe vehicle operating behaviors; and means for transmitting data representative of the determined preferred future travel path of the host vehicle to each of the VANET vehicles.

Example 54 may include elements of example 53 where the means for identifying a rogue vehicle based on the one or more safe vehicle operating behaviors may include: means for detecting information indicative of one or more behaviors associated with the rogue vehicle; and means for comparing the information indicative of the detected one or more behaviors associated with the rogue vehicle with the one or more identified safe vehicle operating behaviors.

Example 55 may include elements of any of examples 53 or 54 where the means for identifying a rogue vehicle based on the one or more safe vehicle operating behaviors may include: means for receiving from one or more VANET vehicles, information indicative of one or more behaviors associated with the rogue vehicle; and means for comparing the information indicative of the received one or more behaviors associated with the rogue vehicle with the one or more identified safe vehicle operating behaviors.

Example 56 may include elements of any of examples 53 through 55 where the means for receiving a plurality of messages, each of the plurality of messages associated with a respective one of a plurality of vehicular ad-hoc network connected vehicles (VANET vehicles) may include: means for receiving a plurality of messages, each of the plurality of messages associated with a respective one of a plurality of vehicular ad-hoc network connected vehicles (VANET vehicles), wherein each of the plurality of messages further includes: information indicative of one or more behaviors of the respective VANET vehicle.

Example 57 may include elements of any of examples 53 through 56 where the means for identifying one or more safe vehicle operating behaviors may include: means for identifying one or more safe vehicle operating behaviors using: the received information indicative of one or more behaviors of respective ones of the VANET vehicles; and the information indicative of one or more behaviors of the host vehicle.

Example 58 may include elements of any of examples 53 through 57 where the means for determining a preferred future travel path for the host vehicle may include: means for determining a preferred future travel path for the host vehicle using: the preferred future travel path of one or more VANET vehicles; the identified rogue vehicle; the one or more safe vehicle operating behaviors; and one or more behavior modes selected by a host vehicle operator.

Example 59 may include elements of any of examples 53 through 58 where the means for identifying a rogue vehicle based on the one or more identified safe vehicle operating behaviors may include: means for identifying, by the rogue vehicle detection circuitry, a rogue vehicle based on: the one or more identified safe vehicle operating behaviors; and one or more vehicle occupant actions indicative of a rogue vehicle.

Example 60 may include elements of any of examples 53 through 59 where the means for receiving a plurality of messages each of the plurality of messages including information indicative of a current location of a respective VANET vehicle may include: means for receiving a plurality of messages, each of the plurality of messages including information indicative of a geolocation of the respective VANET vehicle.

Example 61 may include elements of any of examples 53 through 60 where the means for receiving a plurality of messages each of the plurality of messages including information indicative of a current location of a respective VANET vehicle may include: means for receiving a plurality of messages, each of the plurality of messages including information indicative of a location of the respective VANET vehicle with respect to at least one other VANET vehicle.

Example 62 may include elements of any of examples 53 through 61 where the means for receiving a plurality of messages, each of the plurality of messages associated with a respective one of a plurality of VANET vehicles may include: means for receiving a plurality of messages, each of the plurality of messages associated with a respective one of a plurality of VANET vehicles and including: information indicative of a current location and a future preferred path of the respective VANET vehicle; and information indicative one or more environmental conditions external to the respective VANET vehicle.

Example 63 may include elements of any of examples 53 through 62, and the system may additionally include: means for generating an output signal that includes display data indicative of the preferred future travel path for the host vehicle.

Example 64 may include elements of any of examples 53 through 63, and the system may additionally include: means for generating an output signal that includes display data indicative of the location and preferred future travel path of at least a portion of the plurality of VANET vehicles.

Example 65 may include elements of any of examples 53 through 64, and the system may additionally include: means for generating one or more output signals that cause the host vehicle to autonomously follow the determined preferred future travel path.

According to example 66, there is provided rogue vehicle detection circuitry to generate a communications packet for transmission from a host vehicle to each of at least some of a plurality of vehicular ad-hoc network connected vehicles (VANET vehicles). The communications packet may include: a first field that includes data indicative of a current location of the host vehicle; a second field that includes data representative of a preferred future travel path of the host vehicle; a third field that include data representative of a rogue vehicle, the rogue vehicle non-compliant with at least one of one or more safe vehicle behavior parameters; and a fourth field that includes data indicative of a current location of the rogue vehicle.

Example 67 may include elements of example 66 where the first field included in the communications packet may include data indicative of a current geolocation location of the host vehicle.

Example 68 may include elements of any of examples 66 or 67 where the first field included in the communications packet may include data indicative of a current geolocation location of the host vehicle relative to at least one other of the plurality of VANET vehicles.

Example 69 may include elements of any of examples 66 through 68, and the communications frame may additionally include: a fifth field that includes data indicative of a velocity of the host vehicle.

Example 70 may include elements of any of examples 66 through 69, and the communications frame may additionally include: a sixth field that includes data indicative of a reaction time of the host vehicle with respect to one or more of the plurality of VANET vehicles.

According to example 71, there is provided a system for vehicles connected to a vehicular ad-hoc network to work cooperatively to detect and avoid rogue vehicles, the system being arranged to perform the method of any of examples 1 through 13.

According to example 72, there is provided a chipset arranged to perform the method of any of examples 1 through 13.

According to example 73, there is provided at least one machine readable medium comprising a plurality of instructions that, in response to be being executed on a computing device, cause the computing device to carry out the method according to any of examples 1 through 13.

According to example 74, there is provided a device configured for vehicles connected to a vehicular ad-hoc network to work cooperatively to detect and avoid rogue vehicles, the device being arranged to perform the method of any of examples 1 through 13.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:
1. A rogue vehicle detection system, comprising:
input interface circuitry;
transceiver circuitry;
output interface circuitry;
rogue vehicle detection circuitry coupled to the input interface circuitry, the transceiver circuitry, and the output interface circuitry; and a storage device that includes machine-readable instructions that, when executed by the rogue vehicle detection circuitry, cause the rogue vehicle detection circuitry to:
  receive, via the transceiver circuitry, one or more signals that include information indicative of one or more behaviors of a host vehicle;
  receive, via the transceiver circuitry, a plurality of messages, each respective one of the plurality of messages being associated with a respective one of a plurality of vehicular ad-hoc network connected vehicles (VANET vehicles), each respective one of the plurality of messages including (i) information indicative of a current location, (ii) a future preferred path, and (iii) safe vehicle operating parameters, of each respective VANET vehicle from among the plurality of VANET vehicles;
  identify one or more safe vehicle operating behaviors using the safe vehicle operating parameters of each respective VANET vehicle and safe vehicle operating parameters of the host vehicle;
  identify a rogue vehicle by identifying a respective one of the VANET vehicles that is non-compliant with the one or more identified safe vehicle operating behaviors;
  determine a preferred future travel path for the host vehicle based, at least in part, on (i) the future preferred path of respective ones of the VANET vehicles, (ii) the identified rogue vehicle, and (iii) the one or more safe vehicle operating behaviors; and
  cause a transmission, via the transceiver circuitry, of data representative of the determined future preferred path of the host vehicle to each of the VANET vehicles.

2. The system of claim 1, wherein the machine-readable instructions that cause the rogue vehicle detection circuitry to identify a rogue vehicle using the one or more identified safe vehicle operating behaviors further cause the rogue vehicle detection circuitry to:
  receive, from one or more sensors disposed in the host vehicle, one or more signals that include information indicative of one or more behaviors associated with the rogue vehicle; and
  compare the information indicative of the detected one or more behaviors associated with the rogue vehicle with the one or more identified safe vehicle operating behaviors.

3. The system of claim 1, wherein the machine-readable instructions that cause the rogue vehicle detection circuitry to identify a rogue vehicle using the one or more identified safe vehicle operating behaviors further cause the rogue vehicle detection circuitry to:
  receive, from one or more VANET vehicles, information indicative of one or more behaviors associated with the rogue vehicle; and
  compare the information indicative of the received one or more behaviors associated with the rogue vehicle with the one or more identified safe vehicle operating behaviors.

4. The system of claim 1, wherein the machine-readable instructions that cause the rogue vehicle detection circuitry to receive the plurality of messages further cause the rogue vehicle detection and avoidance circuitry to:
  receive each respective one of the plurality of messages associated with a respective one of a plurality of VANET vehicles, wherein each respective one of the plurality of messages further includes information indicative of one or more behaviors of the respective VANET vehicle.

5. The system of claim 4, wherein the machine-readable instructions that cause the rogue vehicle detection circuitry to identify the one or more safe vehicle operating behaviors further cause the rogue vehicle detection circuitry to:
  identify one or more safe vehicle operating behaviors using (i) the received information indicative of one or more behaviors of respective ones of the VANET vehicles, and (ii) the information indicative of one or more behaviors of the host vehicle.

6. The system of claim 5, wherein the machine-readable instructions that cause the rogue vehicle detection circuitry to determine a preferred future travel path for the host vehicle further causes the rogue vehicle detection circuitry to determine a preferred future travel path for the host vehicle using:
  the preferred future travel path of one or more VANET vehicles;
  the identified rogue vehicle;
  the one or more safe vehicle operating behaviors; and
  one or more behavior modes selected by a host vehicle operator.

7. The system of claim 1, wherein the machine-readable instructions that cause the rogue vehicle detection circuitry to identify a rogue vehicle based on the one or more identified safe vehicle operating behaviors further cause the rogue vehicle detection circuitry to identify a rogue vehicle based on:
  the one or more identified safe vehicle operating behaviors; and
  one or more vehicle occupant actions indicative of a rogue vehicle.

8. The system of claim 1, wherein the machine-readable instructions that cause the rogue vehicle detection circuitry to receive the plurality of messages further cause the rogue vehicle detection circuitry to:
  receive each respective one of the plurality of messages including information indicative of a geolocation of the respective VANET vehicle.

9. The system of claim 1, wherein the machine-readable instructions that cause the rogue vehicle detection circuitry to receive the plurality of messages further cause the rogue vehicle detection circuitry to:
  receive each respective one of the plurality of messages including information indicative of a location of the respective VANET vehicle with respect to at least one other VANEY vehicle.

10. The system of claim 1, wherein the machine-readable instructions that cause the rogue vehicle detection circuitry to receive the plurality of messages further cause the rogue vehicle detection circuitry to:
  receive each respective one of the plurality of messages associated with a respective one of a plurality of VANET vehicles and including:
    information indicative of a current location and a future preferred path of the respective VANET vehicle; and
    information indicative one or more environmental conditions external to the respective VANET vehicle.

11. The system of claim 1, wherein the machine-readable instructions further cause the rogue vehicle detection circuitry to generate an output signal that includes display data indicative of the preferred future travel path for the host vehicle.

12. The system of claim 1, wherein the machine-readable instructions further cause the rogue vehicle detection circuitry to generate an output signal that includes display data indicative of the location and preferred future travel path of at least a portion of the plurality of VANET vehicles.

13. The system of claim 1, wherein the machine-readable instructions further cause the rogue vehicle detection circuitry to generate one or more output signals that cause the host vehicle to autonomously follow the determined preferred future travel path.

14. A rogue vehicle detection method, comprising:
receiving, at rogue vehicle detection circuitry in a host vehicle, one or more signals that include information indicative of one or more behaviors of the host vehicle;
receiving, at transceiver circuitry in the host vehicle, a plurality of messages, each respective one of the plurality of messages being associated with a respective one of a plurality of vehicular ad-hoc network connected vehicles (VANET vehicles), each respective one of the plurality of messages including (i) information indicative of a current location, (ii) a future preferred path, and (iii) safe vehicle operating parameters, of each respective VANET vehicle from among the plurality of VANET vehicles;
identifying, by inner safety belief circuitry, one or more safe vehicle operating behaviors using the safe vehicle operating parameters of each respective VANET vehicle and safe vehicle operating parameters of the host vehicle;
identifying, by the rogue vehicle detection circuitry, a rogue vehicle by identifying a respective one of the VANET vehicles that is non-compliant with the one or more identified safe vehicle operating behaviors;
determining, by trajectory generation circuitry, a preferred future travel path for the host vehicle based on (i) the preferred future travel path of respective ones of the VANET vehicles, (ii) the identified rogue vehicle and (iii) the one or more safe vehicle operating behaviors; and
transmitting, via the transceiver circuitry, data representative of the determined preferred future travel path of the host vehicle to each of the VANET vehicles.

15. The method of claim 14, wherein identifying a rogue vehicle based on the one or more safe vehicle operating behaviors comprises:
detecting, via one or more sensors disposed in the host vehicle, information indicative of one or more behaviors associated with the rogue vehicle; and
comparing, by the rogue vehicle detection circuitry, the information indicative of the detected one or more behaviors associated with the rogue vehicle with the one or more identified safe vehicle operating behaviors.

16. The method of claim 14, wherein identifying a rogue vehicle based on the one or more safe vehicle operating behaviors comprises:
receiving, via the transceiver circuitry from one or more VANET vehicles, information indicative of one or more behaviors associated with the rogue vehicle; and
comparing, by the rogue vehicle detection circuitry, the information indicative of the received one or more behaviors associated with the rogue vehicle with the one or more identified safe vehicle operating behaviors.

17. The method of claim 14, wherein receiving the plurality of messages comprises:
receiving each respective one of the plurality of messages further including information indicative of one or more behaviors of each respective VANET vehicle.

18. The method of claim 17, wherein identifying one or more safe vehicle operating behaviors comprises:
identifying, by the inner safety belief circuitry, one or more safe vehicle operating behaviors using (i) the received information indicative of one or more behaviors of respective ones of the VANET vehicles, and (ii) the information indicative of one or more behaviors of the host vehicle.

19. The method of claim 18, wherein determining a preferred future travel path for the host vehicle further comprises determining a preferred future travel path for the host vehicle using:
the preferred future travel path of one or more VANET vehicles;
the identified rogue vehicle;
the one or more safe vehicle operating behaviors; and
one or more behavior modes selected by a host vehicle operator.

20. The method of claim 14, wherein identifying the rogue vehicle based on the one or more identified safe vehicle operating behaviors comprises identifying, by the rogue vehicle detection circuitry, a rogue vehicle based on:
the one or more identified safe vehicle operating behaviors; and
one or more vehicle occupant actions indicative of a rogue vehicle.

21. The method of claim 14, wherein receiving the plurality of messages comprises:
receiving, at the transceiver circuitry in the host vehicle, each respective one of the plurality of messages including information indicative of a geolocation of each respective VANET vehicle.

22. The method of claim 14, wherein receiving the plurality of messages comprises:
receiving, at the transceiver circuitry in the host vehicle, each respective one of the plurality of messages including information indicative of a location of each respective VANET vehicle with respect to at least one other VANET vehicle.

23. The method of claim 14, wherein receiving the plurality of messages comprises:
receiving each respective one of the plurality of messages associated with a respective one of a plurality of VANET vehicles including (i) information indicative of a current location and a future preferred path of each respective VANET vehicle, and (ii) information indicative one or more environmental conditions external to each respective VANET vehicle.

24. The method of claim 14, further comprising:
generating an output signal that includes display data indicative of the preferred future travel path for the host vehicle.

25. The method of claim 14, further comprising:
generating an output signal that includes display data indicative of the location and preferred future travel path of at least a portion of the plurality of VANET vehicles.

26. The method of claim 14, further comprising:
generating one or more output signals that cause the host vehicle to autonomously follow the determined preferred future travel path.

27. A non-transitory storage device that includes machine-readable instructions that, when executed by rogue vehicle detection circuitry, cause the rogue vehicle detection circuitry to:
receive one or more signals that include information indicative of one or more behaviors of a host vehicle;
receive a plurality of messages, each respective one of the plurality of messages being associated with a respective one of a plurality of vehicular ad-hoc network connected vehicles (VANET vehicles), each respective one of the plurality of messages including (i) information indicative of a current location, (ii) a future preferred path, and (iii) safe vehicle operating parameters, of each respective VANET vehicle from among the plurality of VANET vehicles;
identify one or more safe vehicle operating behaviors using the safe vehicle operating parameters of each respective VANET vehicle and safe vehicle operating parameters of the host vehicle;
identify a rogue vehicle by identifying a respective one of the VANET vehicles that is non-compliant with the one or more identified safe vehicle operating behaviors;
determine a preferred future travel path for the host vehicle based, at least in part, on (i) the future preferred path of respective ones of the VANET vehicles, (ii) the identified rogue vehicle, and (iii) the one or more safe vehicle operating behaviors; and
cause a transmission of data representative of the determined future preferred path of the host vehicle to each of the VANET vehicles.

28. A host vehicle, comprising:
one or more sensors;
at least one output device;
input interface circuitry coupled to the one or more sensors;
transceiver circuitry;
output interface circuitry;
rogue vehicle detection and avoidance circuitry coupled to the input interface circuitry, the transceiver circuitry, and the output interface circuitry; and
a storage device that includes machine-readable instructions that, when executed by the rogue vehicle detection circuitry, cause the rogue vehicle detection circuitry to:
  receive, via the transceiver circuitry, one or more signals that include information indicative of one or more behaviors of a host vehicle;
  receive, via the transceiver circuitry, a plurality of messages, each respective one of the plurality of messages being associated with a respective one of a plurality of vehicular ad-hoc network connected vehicles (VANET vehicles), each respective one of the plurality of messages including (i) information indicative of a current location, (ii) a future preferred path, and (iii) safe vehicle operating parameters, of each respective VANET vehicle from among the plurality of VANET vehicles;
  identify one or more safe vehicle operating behaviors using the safe vehicle operating parameters of each respective VANET vehicle and safe vehicle operating parameters of the host vehicle;
  identify a rogue vehicle by identifying a respective one of the VANET vehicles that is non-compliant with the one or more identified safe vehicle operating behaviors;
  determine a preferred future travel path for the host vehicle based, at least in part, on (i) the future preferred path of respective ones of the VANET vehicles, (ii) the identified rogue vehicle, and (iii) the one or more safe vehicle operating behaviors; and
  cause a transmission, via the transceiver circuitry, of data representative of the determined future preferred path of the host vehicle to each of the VANET vehicles.

29. Rogue vehicle detection circuitry, comprising:
an input interface; and
an output interface configured to transmit a communication packet for transmission from a host vehicle to at least some of a plurality of vehicular ad-hoc network connected vehicles (VANET vehicles), the communications packet comprising:
  a first field that includes data indicative of a current location of the host vehicle;
  a second field that includes data representative of a preferred future travel path of the host vehicle;
  a third field that include data representative of a rogue vehicle, the rogue vehicle non-compliant with at least one of one or more safe vehicle behavior parameters, wherein the rogue vehicle is identified by identifying one or more safe vehicle operating behaviors using safe vehicle operating parameters of each respective VANET vehicle received in a message from each of the plurality of VANET vehicles and safe vehicle operating parameters of the host vehicle, and identifying a respective one of the plurality of VANET vehicles that is non-compliant with the one or more identified safe vehicle operating behaviors; and
  a fourth field that includes data indicative of a current location of the rogue vehicle.

30. The system of claim 1, wherein the one or more safe vehicle operating behaviors are dynamic and change over time in response to changes of the safe vehicle operating parameters of each respective VANET vehicle and changes of the safe vehicle operating parameters of the host vehicle.

* * * * *